United States Patent
Noh et al.

(10) Patent No.: US 8,787,284 B2
(45) Date of Patent: Jul. 22, 2014

(54) METHOD AND APPARATUS FOR TRANSMITTING FRAME IN WLAN SYSTEM

(75) Inventors: Yu Jin Noh, Anyang-si (KR); Byeong Woo Kang, Anyang-si (KR); Dae Won Lee, Anyang-si (KR); Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 13/318,014

(22) PCT Filed: Mar. 15, 2011

(86) PCT No.: PCT/KR2011/001795
§ 371 (c)(1),
(2), (4) Date: Oct. 28, 2011

(87) PCT Pub. No.: WO2011/115408
PCT Pub. Date: Sep. 22, 2011

(65) Prior Publication Data
US 2012/0051312 A1    Mar. 1, 2012

Related U.S. Application Data

(60) Provisional application No. 61/374,626, filed on Aug. 18, 2010, provisional application No. 61/314,079, filed on Mar. 15, 2010, provisional application No. 61/334,179, filed on May 13, 2010, provisional application No. 61/362,283, filed on Jul. 7, 2010.

(51) Int. Cl.
*H04W 4/00* (2009.01)
*H04W 76/02* (2009.01)
*H04L 12/18* (2006.01)
*H04W 72/00* (2009.01)

(52) U.S. Cl.
CPC ............... *H04W 76/023* (2013.01); *H04W 4/00* (2013.01); *H04L 12/189* (2013.01); *H04W 72/005* (2013.01)
USPC ........................................... 370/329; 455/455

(58) Field of Classification Search
CPC ................................................... H04W 76/023
USPC ........................................... 370/329; 455/445
See application file for complete search history.

(56) References Cited

U.S. PATENT DOCUMENTS

| | | | |
|---|---|---|---|
| 7,821,976 B2 * | 10/2010 | Kim et al. | 370/311 |
| 8,233,462 B2 * | 7/2012 | Walton et al. | 370/338 |
| 2005/0249244 A1 | 11/2005 | McNamara et al. | |

(Continued)

FOREIGN PATENT DOCUMENTS

| | | |
|---|---|---|
| JP | 2005-260939 A | 9/2005 |
| JP | 2007-174128 A | 7/2007 |

(Continued)

*Primary Examiner* — Wei Zhao
(74) *Attorney, Agent, or Firm* — Birch, Stewart, Kolasch & Birch, LLP

(57) ABSTRACT

A method of transmitting a frame in a Wireless Local Area Network (WLAN) system, and which includes receiving, by a first station, information about an association identifier (AID) from an access point, the AID identifying the first station in the WLAN system; transmitting, by the first station, a DLS request frame to a second station; receiving, by the first station, a DLS response frame from the second station; generating, by the first station, a PPDU including a VHT-SIG field and a PSDU; and transmitting, by the first station, the PPDU to the second station via the direct link. Further, the VHT-SIG field includes identity information indicating a partial AID that is formed from the AID of the second station and has a length shorter than the length of the AID of the second station.

8 Claims, 24 Drawing Sheets

(56) References Cited

U.S. PATENT DOCUMENTS

| | | |
|---|---|---|
| 2006/0120334 A1 | 6/2006 | Wang et al. |
| 2007/0140197 A1 | 6/2007 | Sawada |
| 2007/0189168 A1 * | 8/2007 | Yao .............................. 370/231 |
| 2008/0298328 A1 | 12/2008 | Sharma |
| 2011/0007692 A1 | 1/2011 | Seok |
| 2011/0090821 A1 | 4/2011 | Seok |

FOREIGN PATENT DOCUMENTS

| | | |
|---|---|---|
| JP | 2009-508451 A | 2/2009 |
| KR | 10-2007-0033287 A | 3/2007 |
| KR | 10-2008-0067092 A | 7/2008 |
| KR | 10-2009-0098568 A | 9/2009 |
| KR | 10-2009-0117560 A | 11/2009 |
| WO | WO 2007/033313 A2 | 3/2007 |

* cited by examiner

METHOD AND APPARATUS FOR TRANSMITTING FRAME IN WLAN SYSTEM

CROSS REFERENCE TO RELATED APPLICATIONS

This application is the National Phase of PCT/KR2011/001795 filed on Mar. 15, 2011, which claims priority under 35 U.S.C. 119(e) to U.S. Provisional Application Nos. 61/314,079 filed on Mar. 15, 2010, 61/334,179 filed on May 13, 2010, 61/362,283 filed on Jul. 7, 2010 and 61/374,626 filed on Aug. 18, 2010. The entire contents of the above applications are hereby incorporated by reference.

TECHNICAL FIELD

The present invention relates to wireless communication, and more particularly, to a method and apparatus for transmitting a frame in a Wireless Local Area Network (WLAN) system.

BACKGROUND ART

With the recent development of information communication technology, a variety of wireless communication techniques are being developed. From among the techniques, WLAN is a technique, enabling wireless access to the Internet at homes or companies or in specific service providing areas through mobile terminals, such as a Personal Digital Assistant (PDA), a laptop computer, and a Portable Multimedia Player (PMP), based on radio frequency technology.

Lots of standardization tasks are being carried out since and Electronics Engineers (IEEE) 802 (i.e., the standard organization for WLAN technique) was set up on February, 1980. The initial WLAN technique was able to support the bit rate of 1 to 2 Mbps through frequency hopping, band spreading, and infrared communication by using a 2.4 GHz frequency band in accordance with the IEEE 802.11 standard, but the recent WLAN technique can support a maximum bit rate of 54 Mbps using Orthogonal Frequency Division Multiplex (OFDM) method. Furthermore, in the IEEE 802.11 standard, the standardization of various techniques, such as the improvements of Quality of Service (QoS), the compatibility of Access Point (AP) protocols, security enhancement, radio resource measurement, wireless access vehicular environment for vehicle environments, fast roaming, a mesh network, interworking with an external network, and wireless network management, is put to practical use or being developed. Furthermore, in order to overcome a limit to the communication speed that has been considered as vulnerabilities in the WLAN technique, IEEE 802.11n has recently been standardized as a technology standard. The object of the IEEE 802.11n is to increase the speed and reliability of a network and to expand the coverage of a wireless network.

More particularly, the IEEE 802.11n standard is based on a Multiple Inputs and Multiple Outputs (MIMO) technique which uses multiple antennas on both sides of a transmitter and a receiver, in order to support a High Throughput (HT) having a data processing speed of 540 Mbps or higher, minimize transmission error, and optimize the data rate. Furthermore, the IEEE 802.11n standard may use not only a coding scheme for transmitting several redundant copies in order to increase reliability of data, but also an Orthogonal Frequency Division Multiplex (OFDM) scheme in order to increase the data rate.

With the spread of the WLAN technique being activated and applications using the WLAN technique being diversified, there is a need for a new WLAN system capable of supporting the throughput higher than the data processing speed supported by the IEEE 802.11n standard. However, an IEEE 802.11n Medium Access Control (MAC)/Physical Layer (PHY) protocol is not effective in providing the throughput of 1 Gbps or higher. This is because the IEEE 802.11n MAC/PHY protocol is for the operation of a station (STA) having a single Network Interface Card (NIC). Accordingly, if the throughput of frames is increased while the existing IEEE 802.11n MAC/PHY protocol remains intact, overhead is increased. Consequently, to improve the throughput of a wireless communication network while the existing IEEE 802.11n MAC/PHY protocol (i.e., the single STA architecture) remains intact is limited.

In order to achieve the data processing speed of 1 Gbps or higher in a wireless communication network, there is a need for a new system which is different from the existing IEEE 802.11n MAC/PHY protocol (i.e., the single STA architecture). A Very High Throughput (VHT) WLAN system is the next version of the IEEE 802.11n WLAN system. The VHT WLAN system is one of the recent IEEE 802.11 WLAN systems which are being newly proposed in order to support the data processing speed of 1 Gbps or higher in a MAC Service Access Point (SAP).

The VHT WLAN system enables a plurality of VHT STAs to access radio channels at the same time in order to efficiently use the channels. To this end, the VHT WLAN system supports transmission of a Multi-User Multiple Inputs Multiple Outputs (MU-MIMO) method using multiple antennas. A VHT Access Point (AP) can perform a Spatial Division Multiple Access (SDMA) transmission method of transmitting spatially multiplexed data to a plurality of VHT STAs. If a plurality of spatial streams is distributed into a plurality of STAs and transmitted at the same time using a plurality of antennas, the entire throughput of a WLAN system can be increased.

Legacy terminals, supporting WLAN systems (e.g., IEEE 802.11a/b/g) anterior to the IEEE 802.11n WLAN system, and HT terminals supporting the IEEE 802.11n WLAN system may be basically operated in an active mode and a Power Saving (PS) mode. A terminal which is stably supplied with power using a power cable is relatively less sensitive to consumption efficiency because the power is stably supplied. On the other hand, a terminal operated by the battery of a certain capacity may be sensitive to power consumption efficiency because it must be operated within the limited power. From a viewpoint of terminal mobility, a terminal which is supplied with stable power through a power cable may have a limit to mobility. On the other hand, a terminal supplied with power from the battery may be less sensitive to mobility. In order to increase the power consumption efficiency of a terminal, a terminal may be operated in the PS mode. A terminal operating in the PS mode repeatedly switches between an awake mode and a sleep mode in order to efficiently use limited power.

Consideration to power consumption efficiency may still be an important issue even in the VHT WLAN system. Accordingly, a new Physical Layer Convergence Procedure (PLCP) frame format and a method of determining and transmitting control information to be transmitted through a PLCP frame need to be taken into consideration by taking power consumption efficiency into consideration in a WLAN system.

SUMMARY OF INVENTION

Technical Problem

Accordingly, the present invention has been made in view of the above problems, and it is an object of the present invention to provide a method of transmitting a PLCP frame that may be used in a WLAN system and an apparatus for supporting the method.

It is another object of the present invention to provide a method of reducing power of a station and an apparatus for supporting the method.

Solution to Problem

In an aspect, a method of a transmission station (STA) transmitting a frame in a Wide Local Area Network (WLAN) system includes transmitting a Direct Link Setup (DLS) request frame, requesting direct link setup with a destination STA, to an Access Point (AP), and receiving a DLS response frame from the AP in response to the DLS request frame, wherein the DLS request frame comprises an Association ID (AID) allocated from the AP to the transmission STA in a process of the transmission STA being associated with the AP.

The DLS response frame may include an AID of the destination STA.

The method may further include generating a Medium Access Control (MAC) Protocol Data Unit (MPDU) to be transmitted to the destination STA, generating a PLCP Protocol Data Unit (PPDU) by attaching a Physical Layer Convergence Procedure (PLCP) header to the MPDU and transmitting the PPDU to the destination STA through the direct link set up in the process of transmitting the DLS request frame and receiving the DLS response frame.

The PLCP header may include a partial AID of the destination STA.

The partial AID of the destination STA may be obtained from the AID of the destination STA.

The length of the AID of the destination STA may be 16 bits, and the partial AID of the destination STA is set to 9 bits of a low order from among the 16 bits of the AID.

The PLCP header may include a DLS transmission indicator, indicating that the PPDU is DLS-transmitted to the destination STA.

In another aspect, A method of a transmission station (STA) transmitting a frame in a WLAN system includes generating an MPDU to be transmitted to a destination STA, generating a PPDU by attaching a PLCP header to the MPDU, and transmitting the PPDU to the destination STA, wherein the PLCP header comprises first transmission information and second transmission information.

The first transmission information may include a partial AID of the transmission STA, and the partial AID is set as some of bit streams having a specific bit size in a bit sequence forming the AID of the transmission STA.

The second transmission information may be set as one or more bits of the remaining bit streams other than the partial AID in the bit sequence forming the AID of the transmission STA.

The first transmission information may include transmission type indication information to the destination STA, and the second transmission information may include STA identification (ID) information for the transmission STA or the destination STA.

When the transmission type indication information indicates broadcast, the STA ID information may include an ID of the transmission STA.

When the transmission STA is an AP, the ID of the transmission STA may be a Basic Service Set (BSS) ID of a BSS based on the AP.

When the transmission type indication information indicates uplink (UL) transmission, the STA ID information may include an ID of the destination STA, and the ID of the destination STA may include an ID of an AP with which the transmission STA is associated.

The ID of the AP may be a BSS ID of a BSS based on the AP.

In still another aspect, a transmission STA operated in a WLAN system includes a transceiver configured to transmit or receive a PPDU, and a processor functionally coupled to the transceiver, wherein the processor is configured to transmit a DLS request frame, requesting direct link setup with a destination STA, to an AP and to receive a DLS response frame from the AP in response to the DLS request frame, and the DLS request frame comprises an AID allocated from the AP to the transmission STA in a process of the transmission STA being associated with the AP.

Advantageous Effects of Invention

There are provided a PLCP frame format applicable to a WLAN system, a method of transmitting the PLCP frame, and an apparatus for supporting the method. The power consumption efficiency of a station of a WLAN system can be increased and an efficient operation according to the type of traffic is possible, by using a new PLCP frame proposed by the present invention.

MODE FOR THE INVENTION

Some embodiments of the present invention will be described in detail below with reference to the accompanying drawings.

A WLAN system in which an embodiment of the present invention is implemented includes at least one Basic Service Set (BSS). The BSS is a set of STAs (stations) successfully synchronized with each other for mutual communication. The BSS may be classified into an independent BSS (IBSS) and an infrastructure BSS.

The infrastructure BSS includes at least one STA and at least one AP (Access Point). The AP is a function medium for providing connection through the wireless medium of each STA within the BSS. The AP may also be called another terminology, such as a centralized controller, a Base Station (BS), and a scheduler.

The STA is a specific function medium, including an MAC (medium access control) and PHY (wireless-medium physical layer) interface to satisfy the IEEE 802.11 standard. The STA may be an AP STA or a non-AP STA, but refers to a non-AP STA different to an AP, unless described otherwise hereinafter. The STA may also be called another terminology, such as User Equipment (UE), a Mobile Station (MS), a Mobile Terminal (MT), a portable device, or an interface card.

The STA may be classified into a VHT-STA, an HT-STA, and a Legacy (L)-STA. The HT-STA refers to an STA supporting the IEEE 802.11n standard, and the L-STA refers to an STA supporting the lower version of the IEEE 802.11n standard (e.g., the IEEE 802.11a/b/g standards). The L-STA is also called a non-HT STA.

Figure 1:
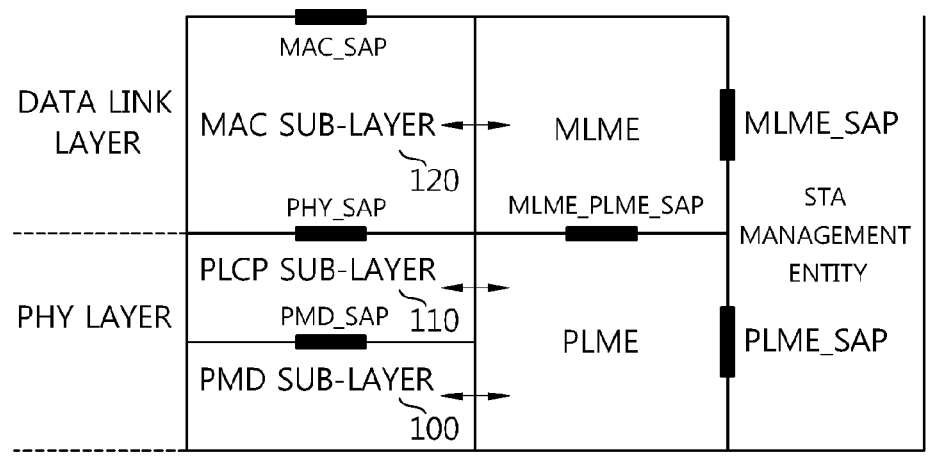
FIG. 1 is a diagram showing the physical layer architecture of IEEE 802.11.

FIG. 1 is a diagram showing the physical layer architecture of the IEEE 802.11 standard.

The PHY layer architecture of the IEEE 802.11 standard includes a PHY Layer Management Entity (PLME), a Physical Layer Convergence Procedure (PLCP) sublayer 110, and a Physical Medium Dependent (PMD) sublayer 100. The PLME provides a function of managing the PHY layer, while operating in conjunction with a MAC Layer Management Entity (MLME). The PLCP sublayer 110 transfers a MAC Protocol Data Unit (MPDU), received from a MAC sublayer 12, to the PMD sublayer 100 or transfers a frame, received from the PMD sublayer 100, to the MAC sublayer 120 according to an instruction of the MAC layer 120 between the MAC sublayer 120 and the PMD sublayer 100. The PMD sublayer 100 is a lower layer of the PLCP, and it enables the transmission and reception of physical layer entities between two STAs through a wireless medium.

The PLCP sublayer 110 adds supplementary fields, including information necessary for physical layer transmitter and receiver, in a process of receiving an MPDU from the MAC sublayer 120 and transferring the MPDU to the PMD sublayer 100. The added fields may become tail bits over a PLCP preamble, a PLCP header, and a data field in the MPDU. The PLCP preamble functions to have a receiver prepared for a synchronization function and antenna diversity before a PLCP Service Data Unit (PSDU) (=MPDU) is transmitted. The PLCP header includes a field including information about a frame. The PLCP header will be described in more detail later with reference to FIG. 2.

In the PLCP sublayer 110, a PLCP Protocol Data Unit (PPDU) is created by adding the above-described field to the MPDU and then transmitted to a reception STA via the PMD sublayer 100. The reception STA receives the PPDU, obtains information for restoring data from the PLCP preamble and the PLCP header, and restores the data based on the information.

Figure 2:
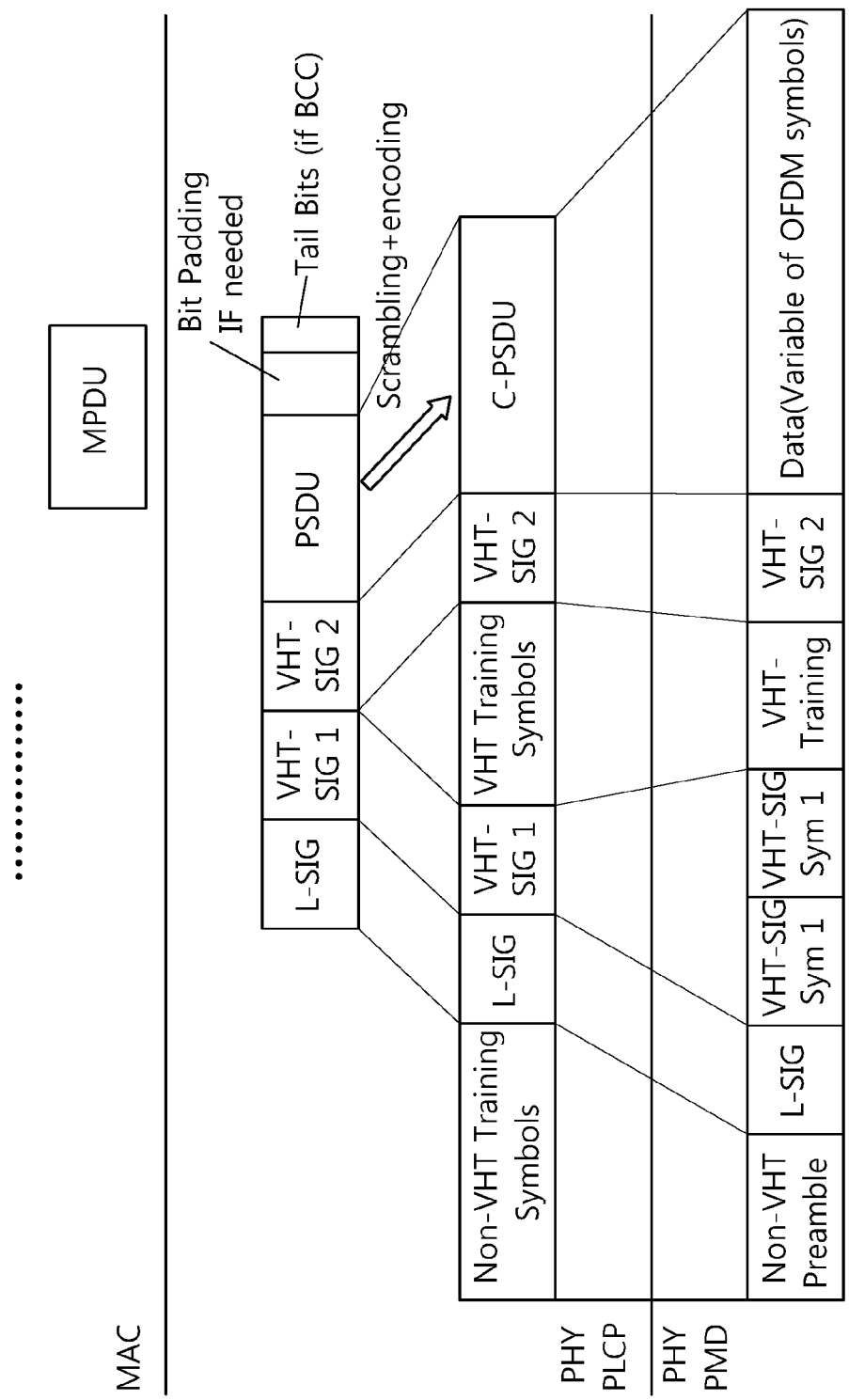
FIG. 2 shows an example of a procedure of transmitting a PLCP frame.

FIG. 2 shows an example of a procedure of transmitting the PLCP frame.

The MPDU of the MAC sublayer is transferred to the PLCP sublayer of the PHY layer for transmission through a wireless medium. In the PLCP sublayer, an L-SIG field, including control information about an L-STA, and a VHT-SIG1 field and a VHT-SIG2 field, including control information about a VHT STA, are added, and padding bit may be added as occasion demands. Furthermore, tail bits may be further added according to an encoding scheme. Here, non-VHT training symbols and VHT training symbols are added. The non-VHT training symbols are used for a reception STA to obtain frame timing acquisition, Automatic Gain Control (AGC), and coarse frequency and may be used for channel estimation for demodulating L-SIG and VHT-SIG1 fields. The VHT training symbols may be used for channel estimation for demodulating a VHT-SIG2 field.

The MPDU of the MAC sublayer is transmitted from the PMD sublayer to a counterpart STA through a wireless medium via the PLCP sublayer. In the PMD layer, the PPDU transmitted through a wireless medium includes a non-VHT preamble, fields, such as L-SIG, VHT-SIG1, VHT-SIG2, VHT-training, and VHT-SIG2, and data fields. Hereinafter, in the PLCP layer of a transmission STA (including an AP), fields added to the PSDU received from the MAC layer are generally referred to as a PLCP preamble and a PLCP header.

The PLCP frame according to the embodiment of the present invention includes information about a target STA. The target STA information may be included in a field added to the MPDU in the PLCP sublayer or may be added as a separate field and transmitted. The target STA information is different from a receiver address (or a receiving station address RA) or a destination address (DA) in the MAC protocol layer, included in the MPDU. In other words, in the MAC protocol layer, unlike a receiver address or a destination address set in the address field of an MAC header and then transmitted, the target STA information of the present invention is added to the MPDU in the PLCP sublayer and then transmitted. For example, in the transmission of the target STA information according to the present invention, the target STA information may be included in the VHT-SIG field added in the PLCP sublayer and then transmitted. Hereinafter, a detailed example of the target STA information and an operation of an STA receiving or overhearing the PLCP frame proposed by the present invention are described in connection with various embodiments.

Figure 3:
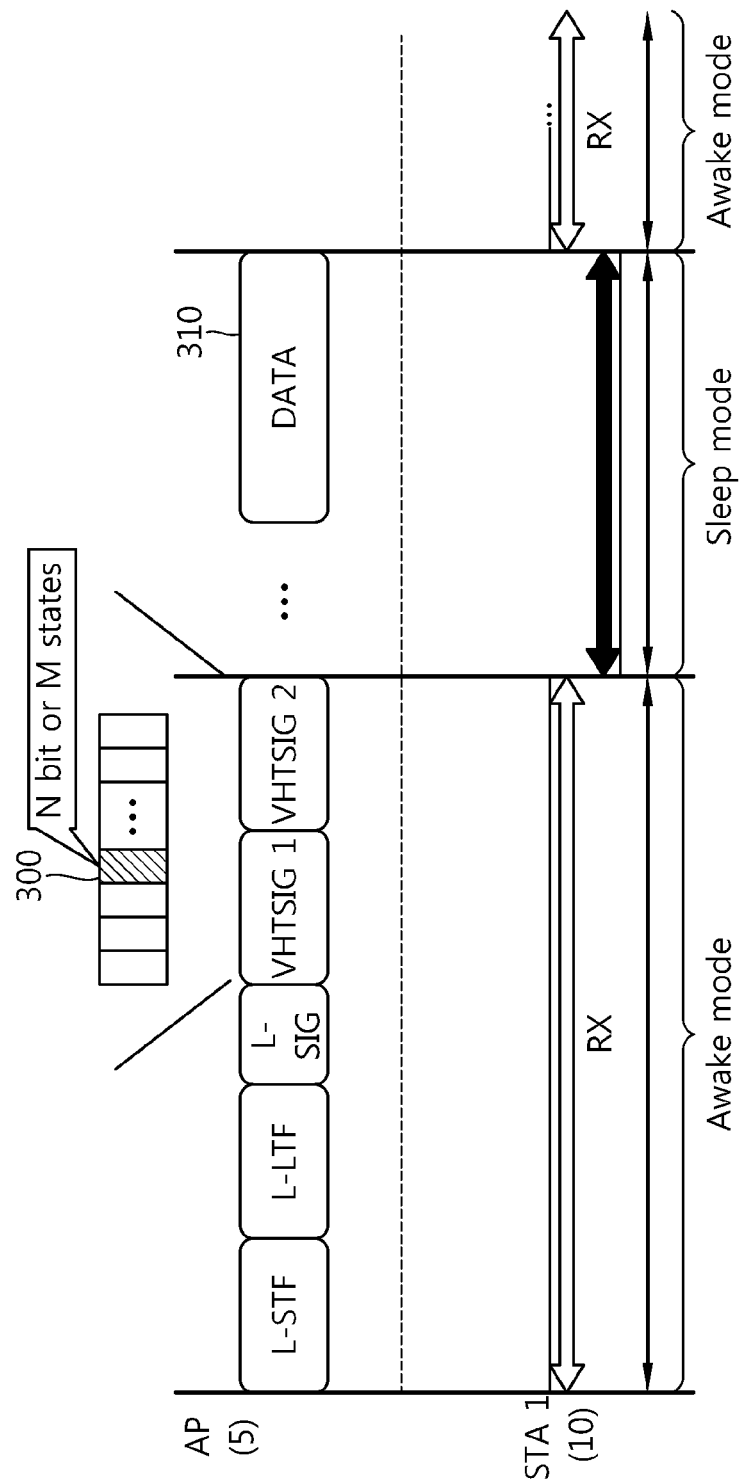
FIG. 3 shows an example of the configuration of the PLCP frame and of the transmission of target STA information according to an embodiment of the present invention.

FIG. 3 shows an example of the configuration of the PLCP frame and of the transmission of target STA information according to an embodiment of the present invention.

In the example of FIG. 3, an AP (5) is illustrated to transmit the PLCP frame to an STA 1 (10), but the present invention is not limited thereto. A terminal transmitting the PLCP frame may be an STA, and a terminal receiving the PLCP frame may be an STA or an AP.

The AP (5) adds a PLCP preamble and a PLCP header to an MSDU, including data 310 to be transmitted to the STA 1 (10), in a PLCP sublayer implemented in the AP (5). Here, target STA information may be included in a VHT-SIG1 or VHT-SIG2 field. More particularly, the VHT-SIG1 or VHT-SIG2 field may include N bits including the target STA information. The N bits included in the VHT-SIG1 or VHT-SIG2 field may directly indicate the target STA information, or the N bits may have a form indicating any one of M kinds of states that may be represented by the N bits. That is, the N bits may be index information to indicate any one of M kinds of preset states.

In a WLAN system, while an STA does not perform transmission, the STA performs carrier sense in order to receive radio frames that are not known when they are received. If carriers are detected as a result of the carrier sense, the STA determines whether relevant data packets in the MAC sublayer are information for its own by demodulating the data packets. Accordingly, the STA consumes power in order to demodulate and decode all received data packets. It leads to a reduction in the power efficiency of the STA.

The target STA information included in the PLCP header may be used to increase the power efficiency of an STA which receives or overhears the PLCP frame. The receiving or overhearing STA may determine whether to enter a sleep mode based on the target STA information in order to reduce demodulation and decoding for unnecessary data packets.

This is described with reference to the example of FIG. 3. The PLCP header of the PLCP frame transmitted by the AP (5) includes the N bits or comparable M pieces of the state information 300. If the STA 1 (10) reads the header of the PLCP frame transmitted by the AP (5) and knows that the header of the PLCP frame is not for its own data or information, the STA 1 (10) does not need to decode subsequent fields. In this case, the STA 1 (10) may switch to the sleep mode. Here, the VHT-SIG field may further include period information, indicating the period in which the STA 1 (10) will be operated in the sleep mode. During the period indicated by the period information, the STA 1 (10) may be operated in the sleep mode. The period in which the STA 1 (10) is operated in the sleep mode may be a period until the data field 310 is transmitted or until an ACK frame for data is transmitted. In the case where an ACK frame for data is not immediately transmitted and data is consecutively transmitted according to an ACK policy, the STA 1 (10) may be operated in the sleep mode until the data field of a first PLCP frame is transmitted.

In the example of FIG. 3, the target STA information transmitted through the N bits may be ID information about the STA. That is, if a physical ID that may be represented by the N bits or the comparable M pieces of state information is assigned to each STA, the STA can distinguish information assigned thereto from information assigned to another STA. Accordingly, the STA does not need to detect all pieces of information as in the operations of the existing STAs. In other words, if a corresponding PLCP frame is determined to be unnecessary for itself or to be information for other STAs, a corresponding STA may switch to the sleep mode in order to reduce power consumption.

The physical ID may be, for example, a group ID. In the group ID, STAs that may become candidates for supporting an MU-MIMO operation is grouped into one group, and a group ID is assigned to the group. An STA determines that a PLCP frame, having the same group ID as a group to which the STA belongs, is for its own and that a PLCP frame, having a different group ID from the group to which the STA belongs, has data/information unnecessary for the STA. Accordingly, the STA may no longer perform demodulation and decoding for the relevant PLCP frame and switch to the sleep mode.

Figure 4:
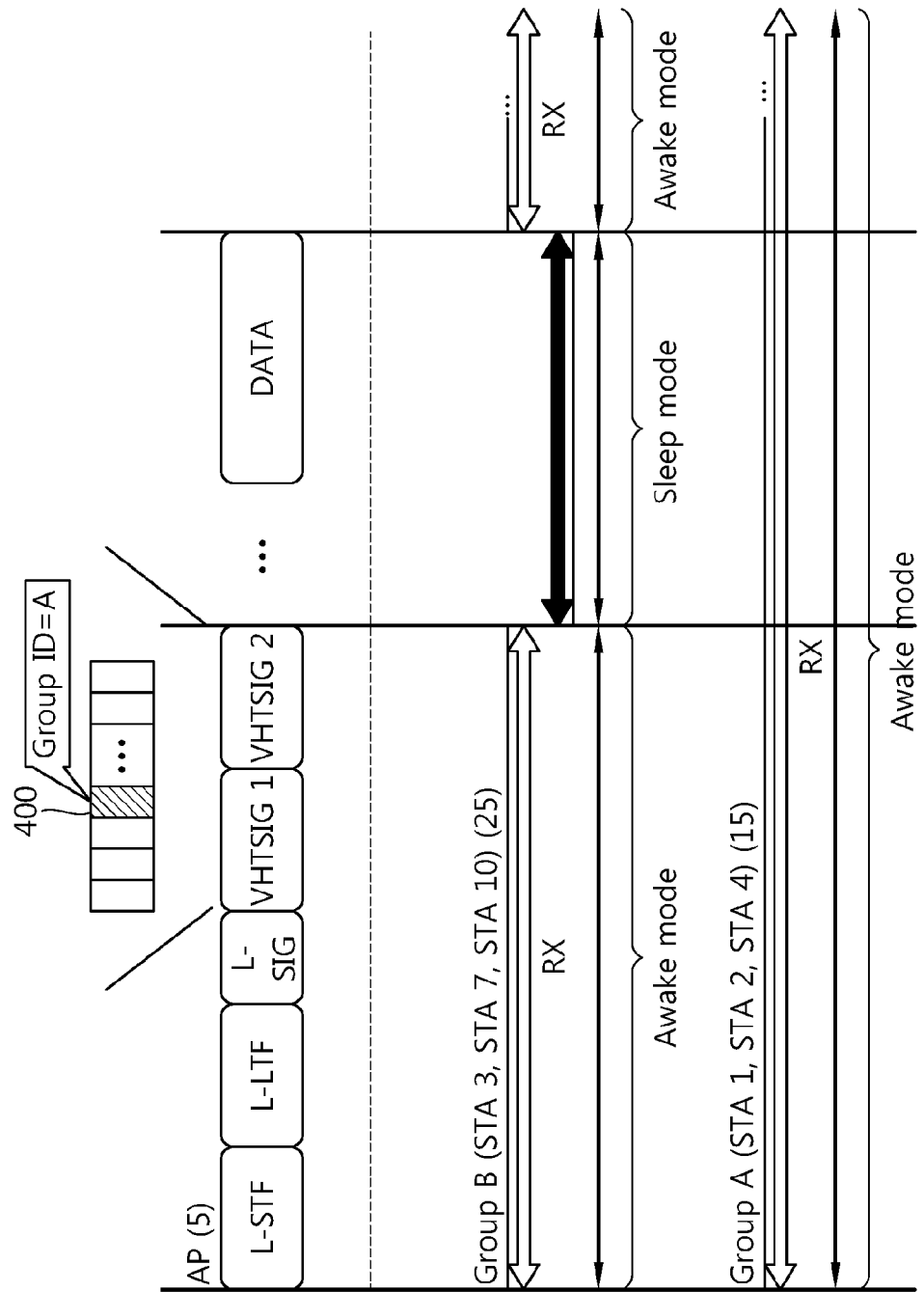
FIG. 4 shows an example in which a group ID is included in a PLCP header and transmitted.

FIG. 4 shows an example in which the group ID is included in the PLCP header and transmitted.

In FIG. 4, it is assumed that an STA 1, an STA 2, and an STA 4 constitute a Group A (25) and assigned a Group ID=A, and an STA 3, an STA 7, and an STA 10 constitute a Group B (15) and assigned a Group ID=B. Here, if the data of a PLCP frame is transmitted to the STAs of the Group A (15), the STAs belonging to the Group B (25) knows that the data of a PLCP frame is unnecessary based on group ID information 400 included in the PLCP header of the PLCP frame and may switch to the sleep mode without further demodulation or decoding for subsequent fields.

In the above method, an STA that has received the PLCP frame determines whether the PLCP frame is unnecessary based on the physical ID included in the PLCP header. According to another embodiment of the present invention, Cyclic Redundancy Check (CRC) masking may be used in the PLCP frame. In other words, if a specific sequence given to each STA is masked to a CRC and transmitted, an STA can determine whether corresponding information is given to or necessary for the STA in a process of detecting the preamble of a PLCP frame. If the information is determined to be for another STA, the STA may switch to the sleep mode.

Figure 5:
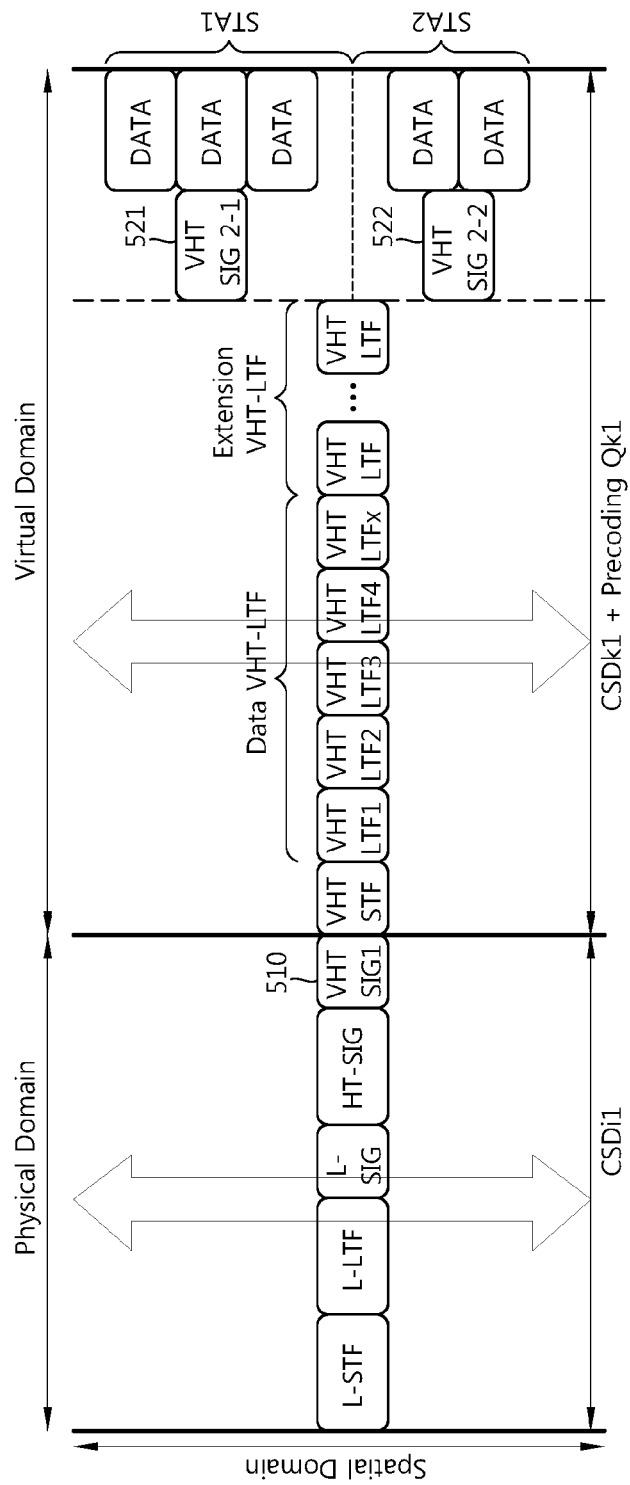
FIG. 5 shows an example of a PLCP frame format to which the present invention may be applied.

FIG. 5 shows an example of a PLCP frame format to which the present invention may be applied.

The example of FIG. 5 shows a case where data is transmitted to an STA 1 and an STA 2 according to the MU-MIMO method. A VHT-SIG1 field 510 is transmitted omni-directionally without precoding so that it can be received and recognized by all STAs. The VHT-SIG1 field 510 includes information common to all STAs. For example, information about which stream is allocated to each STA, information about the total number of streams, and so on may be transferred to each STA through the VHT-SIG1 field 510.

The VHT-SIG1 field 510 and the VHT-LTF field may be transmitted in a non-overlapping manner. Next, a VHT-SIG2-1 field 521 and a VHT-SIG2-2 field 522, including data information and control information for each STA, may be transmitted in an overlapping manner. The VHT-SIG2-1 field 521 and the VHT-SIG2-2 field 522 may be placed at the rear of the preamble.

Assuming that the VHT-SIG1 field 510, including the common control information for STAs, and the VHT-SIG2-1 field 521 and the VHT-SIG2-2 field 522, including the control information for each of the STAs, include bits for a CRC, CRC masking may be performed on the CRC bits included in the VHT-SIG2-1 field 521 and the VHT-SIG2-2 field 522 which include the information unique to each STA. If a specific sequence for each STA is masked to the CRC of the VHT-SIG2 field, including the control information for each STA, and transmitted, the STA can determine whether data/information is for its own in a process of detecting a PLCP frame. If the data/information is determined to be for another STA, the STA may switch to the sleep mode.

Figure 6:
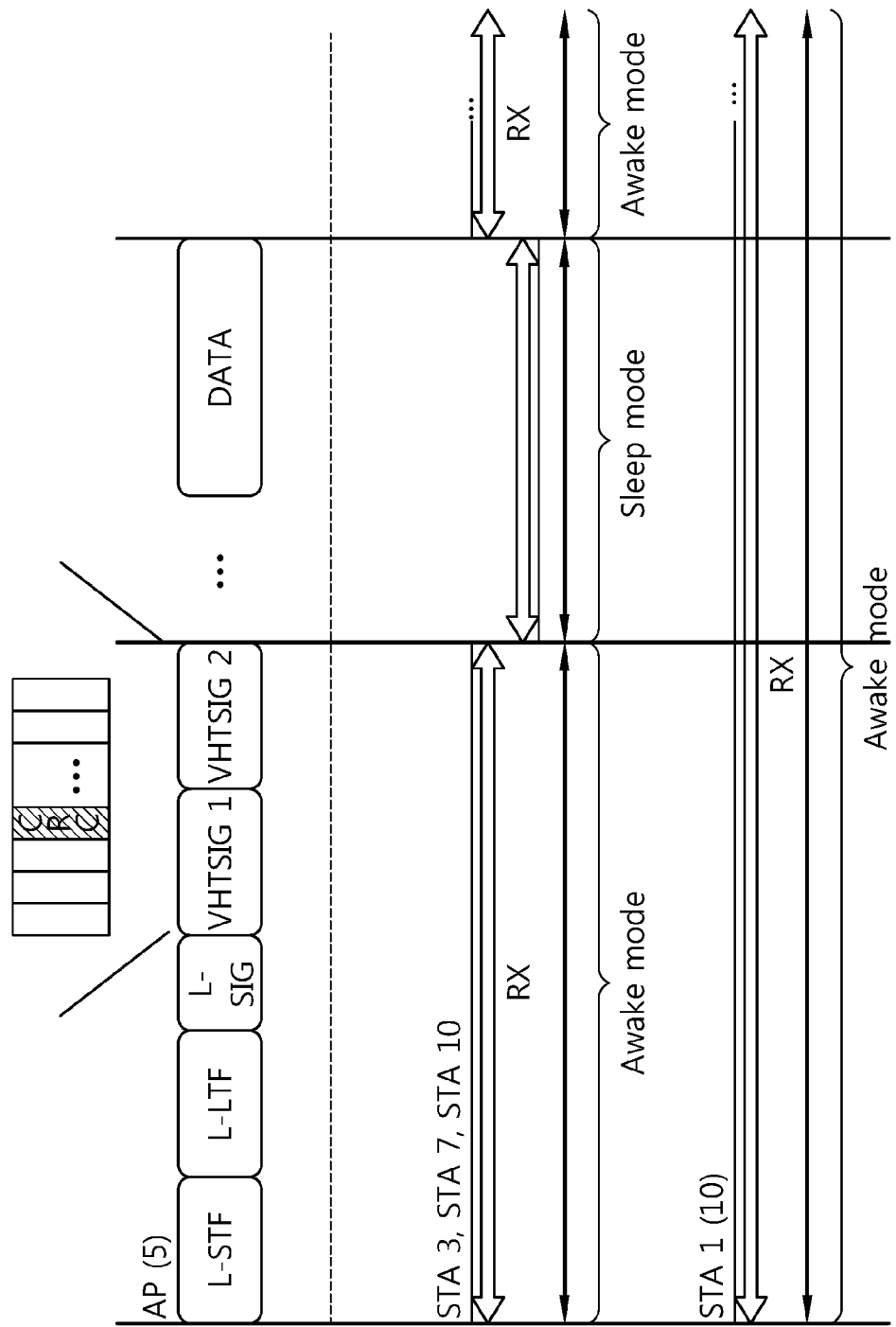
FIG. 6 shows an example in which a unique sequence of an STA to which data will be transmitted is masked to the CRC value of a VHT-SIG field and transmitted.

FIG. 6 shows an example in which a unique sequence of an STA to which data will be transmitted is masked to the CRC value of a VHT-SIG field and transmitted. Each STA determines whether data is transmitted to himself by comparing a STA-specific ID and a masked value. If, as a result of the determination, the data is determined not to be its own data, the STA may switch to the sleep mode in order to reduce power consumption. In the example of FIG. 6, a STA-specific ID of an STA 1 (10) is masked to a CRC and then transmitted. Accordingly, the STA 1 (10) remains in the RX mode (i.e., an awake mode), but the remaining STAs (i.e., an STA 3, an STA 7, and an STA 10) decode VHT-SIG fields and then switch to the sleep mode.

In accordance with another embodiment of the present invention, the VHT-SIG field of the PLCP header may include a field, providing information about whether an STA will continue to perform overhearing.

When an STA A and an STA B transmit data frames after exchanging a Request To Send (RTS) frame and a Clear To Send (CTS) frame, surrounding STAs overhear the entire process. If the surrounding STAs do not overhear relatively short control frames, such as RTS/CTS frames transmitted in order to avoid collision, but overhear relatively long data frames for other STAs, it is waste from a viewpoint of power efficiency.

In order to solve the problem, information (e.g., a non-overhearing bit) to indicate whether other STAs will continue to perform overhearing may be transmitted. In accordance with an embodiment of the present invention, the VHT-SIG field of the PLCP frame may include the non-overhearing bit. The non-overhearing bit may have a length of 1 bit. If the non-overhearing bit is set to 0 (non-overhearing bit==0) and transmitted, an STA which has received the non-overhearing bit continues to perform overhearing. If the non-overhearing bit is set to 1 (non-overhearing bit==1) and transmitted, an STA which has received the non-overhearing bit may does not continue to perform overhearing, but switch to the sleep mode. The RTS frame and the CTS frame are frames that all STAs must overhear in order to avoid collision. Accordingly, an STA that transmits the RTS frame or the CTS frame may set the non-overhearing bit to 0 and transmit the set non-overhearing bit. Meanwhile, in the case where data is transmitted, the non-overhearing bit may be set to 1 and transmitted in order to prevent STAs, other than an STA that must receive the data, from continuing to perform unnecessary overhearing.

For another example, the non-overhearing bit may be added to information transmitted in uplink (UL) and information transmitted in downlink (DL) and then transmitted so that an STA can reduce power. Here, UL transmission means that one or more STAs transmit radio frames to an AP, and DL transmission means that an AP transmits radio frames to one or more STAs.

In the case of DL transmission, an STA needs to sense the busy/idle state of a medium and to continue to perform overhearing in order to receive its own radio frame. Accordingly, in DL transmission, the non-overhearing bit may be set to 0 and transmitted. On the other hand, in UL transmission, since an STA transfers information to only an AP, other STAs do not need to perform overhearing. In other words, the non-overhearing bit may be set to 1 and transmitted.

An AP may set the non-overhearing bit to 1 and transmit the set non-overhearing bit, when sending a data frame to a specific STA. An AP may set the non-overhearing bit to 0 and transmit the set non-overhearing bit, when sending a multicast frame or a broadcast frame.

An STA may set the non-overhearing bit to 1 when sending a data frame to an AP and set the non-overhearing bit to 0 when sending a data frame to another STA.

If the non-overhearing bit is set to 1, an STA does not receive an MPDU following a PLCP header, but may switch to the sleep mode. If the non-overhearing bit is set to 0, however, an STA has to receive both the PLCP header and the subsequent MPDU.

Figure 7:
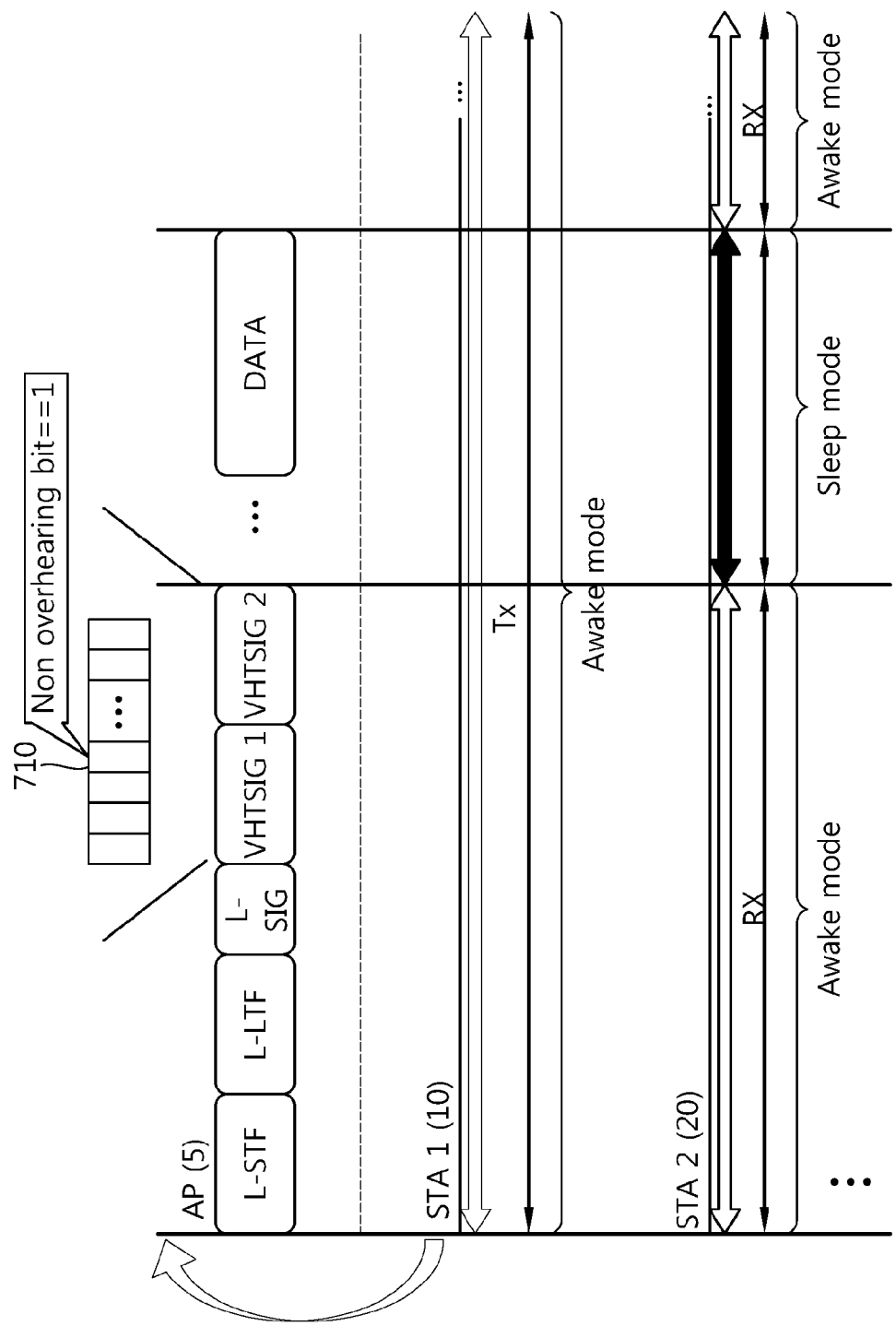
FIGS. 7 and 8 show examples in which a UL data frame and a DL data frame are transmitted according to an embodiment of the present invention.
Figure 8:
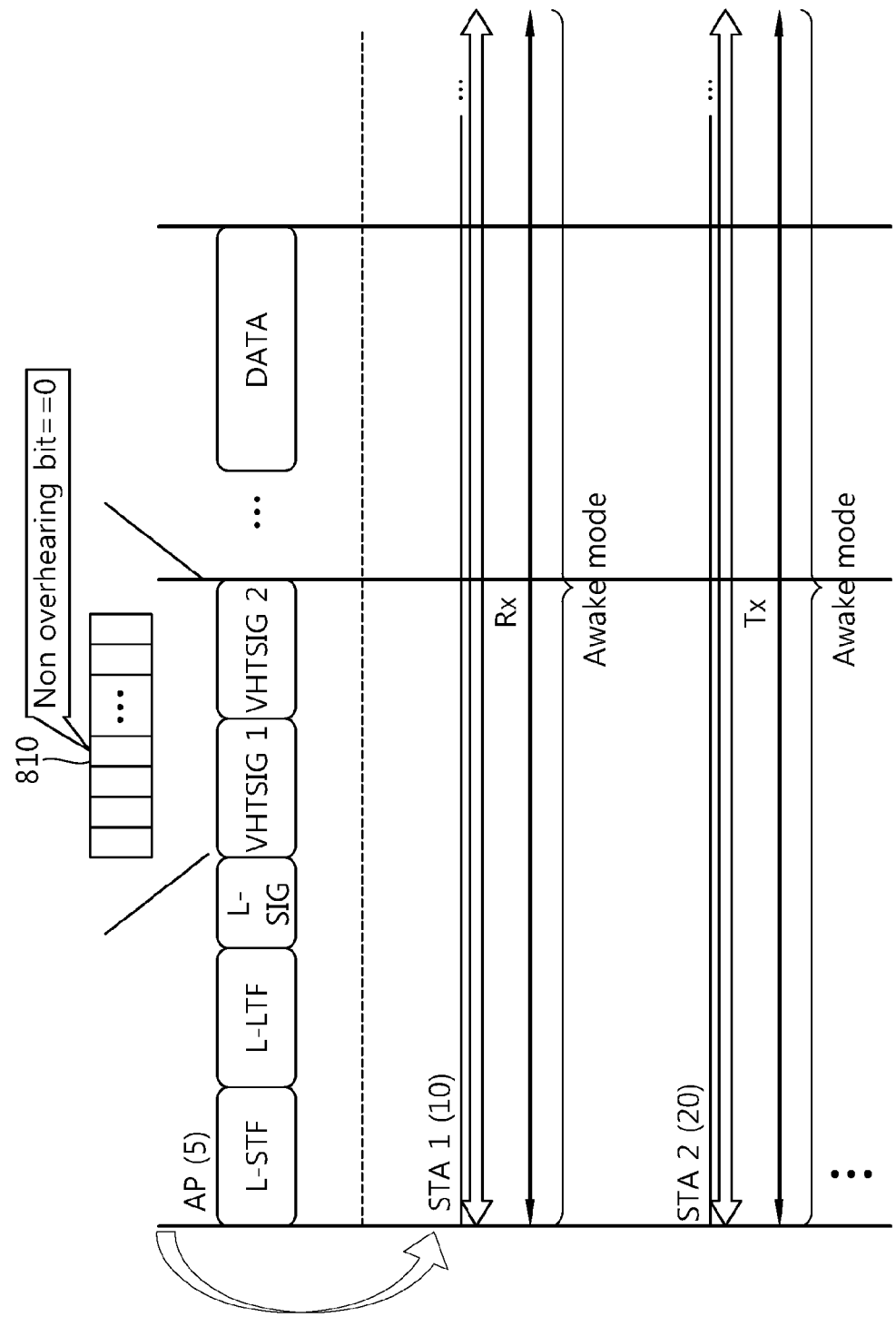

FIGS. 7 and 8 show examples in which a UL data frame and a DL data frame are transmitted according to an embodiment of the present invention.

In FIG. 7, when an STA 1 (10) transmits a UL data frame to an AP (5), an STA 2 (20) determines that fields subsequent to VHT-SIG fields need not to be decoded by checking a non-overhearing bit 710 set to 1 in a VHT-SIG field and switches to the sleep mode.

In FIG. 8, when an AP (5) transmits a DL data frame to an STA 1 (10), an STA 2 (20) maintains the RX mode (i.e., an awake mode) in which a radio frame can be received because it has to sense the state of a medium. Here, a non-overhearing bit 810 included in the VHT-SIG field of a data frame transmitted by the AP (5) may be set to 0.

The embodiment of the present invention described above with reference to FIGS. 7 and 8 shows an example in which the non-overhearing bit, indicating whether STAs will continue to perform overhearing, is included in the PLCP header and then transmitted. In accordance with another embodiment of the present invention, the PLCP header may include a transmission type field/bit stream, including information indicating a class according to a transmission type.

Table 1 shows classes according to transmission types. In the class types of Table 1, the sequence is arbitrary, and the present invention is not limited thereto. The details are exemplary and may be reduced or increased as occasion demands.

TABLE 1

| class type | Details |
| --- | --- |
| 1 | AP → STA |
| 2 | STA → AP |
| 3 | STA → STA |
| 4 | AP → AP |
| 5 | Broadcasting |
| ... | ... |

A bit stream indicating the transmission type class may be included in the VHT-SIG field. An STA may check the transmission type (e.g., DL transmission, UL transmission, or broadcasting) of a relevant PLCP frame based on a bit stream indicating a transmission type class and determine whether to switch to the sleep mode.

In accordance with another embodiment of the present invention, indication information for distinguishing an STA and a BSS from each other may be included in the VHT-SIG field. An association ID (AID) may be used as indication information for distinguishing STAs from each other. A BSS ID may be used as indication information for distinguishing BSSs from each other. The indication information is described in detail below in connection with embodiments.

An IEEE 802.11n WLAN system supports SU-MIMO transmission using a maximum of four spatial streams, but a VHT WLAN system can support MU-MIMO transmission in addition to SU-MIMO transmission. In the transmission of a radio frame using SU-MIMO and the transmission of a radio frame using MU-MIMO, if the same PLCP frame format is used, some of control information included in the VHT-SIG field in order to support MU-MIMO may have nothing influence if transmission using SU-MIMO is performed. In other words, the control information may become unnecessary information. For example, if a group ID, indicating STAs (i.e., the subject of MU-MIMO transmission), and information, indicating a stream number allocated to each target STA of MU-MIMO transmission, are included in the VHT-SIG field in order to support MU-MIMO transmission, the group ID and the information may become meaningless information for an STA operating according to the SU-MIMO scheme.

Assuming that 4 MU-MIMO transmission target STAs can receive 0 to 4 spatial streams, respectively, 4 bits for setting a group ID to indicate the four MU-MIMO transmission target STAs and a maximum of 12 bits to indicate stream numbers may be used in the VHT-SIG field. In accordance with SU-MIMO transmission, to transmit the 12 bits may be meaningless or waste of radio resources. Accordingly, in accordance with the SU-MIMO transmission, a scheme for transmitting different pieces of information that may be used in the SU-MIMO transmission by using bits used to inform information for MU-MIMO transmission may be taken into consideration.

An AP or an STA trying to transmit a radio frame may include different pieces of information in data according to a case where the data is sought to be transmitted in the MU-MIMO format and a case where the data is sought to be transmitted in the SU-MIMO format, when generating the VHT-SIG field. An AP or an STA that has received the radio frame may interpret that a VHT-SIG field within a PLCP header indicates different pieces of information by dividing a case where the radio frame is received according to SU-MIMO transmission and a case where the radio frame is received according to MU-MIMO transmission, when interpreting the VHT-SIG field.

For example, when an SU/MU-MIMO indication bit to indicate SU-MIMO transmission or MU-MIMO transmission means the SU-MIMO transmission, an STA may differently interpret a bit stream indicative of a group ID within a VHT-SIG field and a bit stream indicative of the number of spatial streams in the case of the MU-MIMO transmission. Here, the group ID is an ID to indicate the group of target STAs according to MU-MIMO transmission, and the number of spatial streams indicates the number of spatial streams that must be received by each of the target STAs according to MU-MIMO transmission.

As an example in which a bit stream is differently interpreted, according to SU-MIMO transmission, an STA may interpret a bit stream indicative of a group ID and a bit stream indicative of the number of spatial streams as a bit stream in which an AID and operated. This is described from a viewpoint of a transmission STA (including an AP). If the transmission STA is sought to perform SU-MIMO transmission, the transmission STA may set an AID in a VHT-SIG field, instead of the bit stream indicative of a group ID and the bit stream indicative of the number of spatial streams, and transmit the association ID. Here, a BSS ID other than the AID may be included in the VHT-SIG field as information which is set instead of the bit stream indicative of a group ID and the bit stream indicative of the number of spatial streams and then transmitted.

An AID that an AP, supporting the IEEE 802.11 standard, may allocate the AID to an STA in the association process may have a length of 16 bits, and the 16 bits may include 14 Least Significant Bits (LSBs) and 2 Most Significant Bits (MSBs) 2 bits. The AID value has a value ranging from 1 to 2007 and thus requires a minimum of 11 bits in order to represent 1 to 2007. A BSS ID is an ID of a BSS. In the case of an infrastructure BSS, the BSS ID may be the MAC address of an AP and is information corresponding to 6 bytes. In the AID and the BSS ID, all bit fields that can be included in the AID and the BSS ID may be difficult to be accommodated in a limited VHT-SIG field. Accordingly, the AID and the BSS ID may be mapped to a specific power save ID by reducing the bits through a hash function and then used. As an example of hashing, only part of the bits of the AID or BSS ID may be used as a power save ID.

In the case where bit fields allocated to a VHT-SIG field are insufficient and thus may not be used to include and transmit the entire AID, some of the AID may be included in the VHT-SIG field. For example, an AP may include 9 LSB bits, from among the 16 bits of an AID allocated in the association process, and a partial AID, corresponding to the 9 LSB bits of a lower order, in a VHT-SIG field and transmit the VHT-SIG field.

The above method in which the transmission STA transmits different pieces of information, included in the VHT-SIG field, according to the MU-MIMO transmission scheme and the SU-MIMO transmission scheme and the reception STA differently interprets the information, included in the VHT-SIG field, according to the MU-MIMO transmission scheme and the SU-MIMO transmission scheme may be used as a method for increasing the power consumption efficiency of an STA.

An STA reads the AID or partial AID which is included in the VHT-SIG and transmitted. If the AID is not identical with its own AID or partial AID, the STA determines that a corresponding PLCP frame is unnecessary and may switch to the sleep mode without decoding for subsequent fields.

In another embodiment, information about a combination of indicators (e.g., BSS IDs) for distinguishing an AID and a BSS from each other may be included in the VHT-SIG field and then transmitted. In this case, only STAs having an AID included in a specific BSS may receive data, but STAs not having the AID included in the specific BSS may switch to the sleep mode. This may be usefully used in an OBSS environment and will be described in detail later with reference to relevant drawings.

Figure 9:
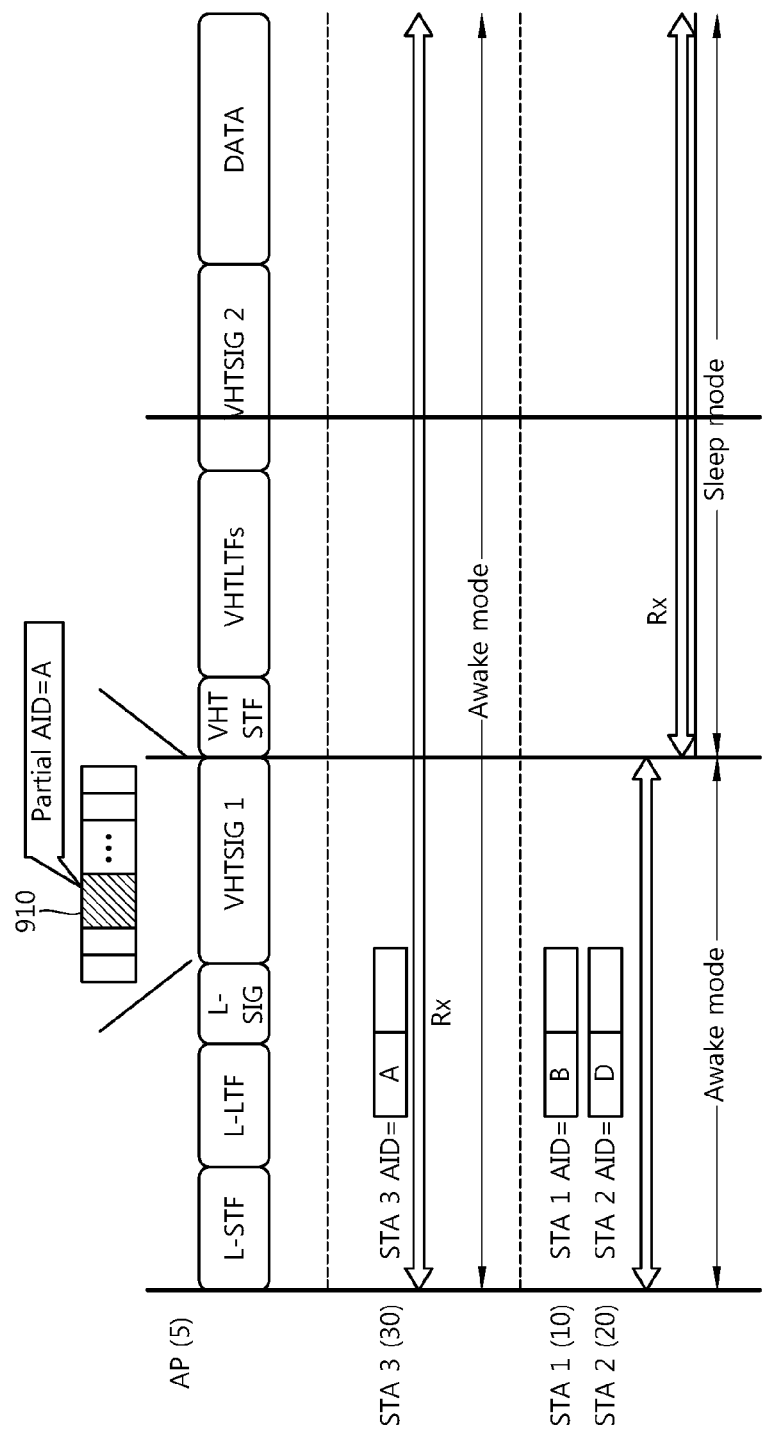
FIG. 9 shows an example in which a partial AID is included in a VHT-SIG field and transmitted.

FIG. 9 shows an example in which a partial AID is included in a VHT-SIG field and transmitted.

In the example of FIG. 9, an AP (5) transmits a PLCP frame 900 to an STA 3 (30). A VHT-SIG1 field included in the PLCP header of the PLCP frame 900 includes a partial AID 910. As described above, the partial AID is obtained by taking some of the bits of the AID that an AP allocates the AID to each STA in an association process with the STA. In the example of FIG. 9, the partial AID 910 is set to A, which is the value of 9 LSB its of an AID of the STA 3 (30). In other words, in the example of FIG. 9, the AP (5) includes the partial AID of the STA 3 (30) in the VHT-SIG1 field and transmits the VHT-SIG1 field.

An STA 1 (10) and an STA 2 (20), other than the STA 3 (30) whose partial ID is A, may switch to the sleep mode because they need not to read information about fields transmitted subsequently to the VHT-SIG1 field.

For another example, the partial AID may be included in a VHT-SIG2 field and then transmitted. In this case, the STA 1 (10) and the STA 2 (20) may read up to the VHT-SIG2 field and switch to the sleep mode by checking that a corresponding frame is unnecessary for him.

In order to utilize the partial AID according to an embodiment of the present invention, an AP allocates the partial AID to different STAs so that the partial AID is not redundant to the different STAs, in relation to bits that may be used as the partial AID, when performing an association process with the STAs. For example, in the case where N bits anterior to the partial AID are used as the partial AID, an AP may allocate different N bits to a 2N number of STAs in an association process with the STAs. The number of STAs that can be distinguished from each other by using 11 bits is 2007, but it is unrealistic for an AP to manage about 2007 STAs at the same time. Accordingly, if 2N is greater than the number of STAs that are managed by an AP at the same time, all the 11 bits of the partial AID may not be used, but N bits may be used. Hereinafter, the N bits is defined as a partial AID or a power save ID and used.

If an AP manages the number of STAs greater than $2^N$ (i.e., the number of STAs that can be managed using a power save ID), an STA that is associated with the AP at a $(2^N+1)^{th}$ position may share a power save ID already being used. It is preferred that several STAs not share one power save ID, if possible. It is assumed that when a $2^N$ number of STAs are associated with an AP, an STA 1=power save ID 1, an STA 2=power save ID 2, ..., an STA $2^N$=power save ID 2, an STA $2^N+1$=power save ID 1, and an STA $2^N+2$=power save ID 1. In the case where the three STAs share the one power save ID 1 as described above, if the AP includes the power save ID 1 in the VHT-SIG field and transmits the VHT-SIG field in order to transmit data to the STA 1, the STA $2^N+1$ and the STA $2^N+2$ may not switch to the sleep mode, although the data is unnecessary for the STA $2^N+1$ and the STA $2^N+2$.

A power save ID may be usefully used even in supporting MU-MIMO transmission. When an AP tries to transmit a specific spatial stream using MU-MIMO transmission to an STA 1, the STA 1, an STA 2, and an STA 3 may think that the specific spatial stream is allocated thereto and may operate. This is because the STAs are basically operated in the RX mode (i.e., a reception standby state) in order to receive a radio frame that is not known when the radio frame will be received to the STAs. This problem is generated because a radio frame does not include ID information for determining whether the radio frame is transmitted to which STA in the physical level and thus STAs receive all radio frames whose carries are detected according to Clear Channel Assessment (CCA) and perform demodulation and decoding for the radio frames.

If information, indicating that a PLCP frame is for which STA, is included in the VHT-SIG field of the PLCP frame, the above problem can be solved. Here, the VHT-SIG field may be the VHT-SIG2 field of FIG. 9 which is configured to include control information for each STA and transmitted. For example, in the example of FIG. 9, the STA 1 (10) and the STA 2 (20) which have read a power save ID meaning the AID of the STA 3 (30), included in the VHT-SIG2 field that may be called an STA-specific SIG field and transmitted, may reduce power consumption by switching to the sleep mode.

In a WLAN system, an STA always basically maintains the RX mode (i.e., a reception standby state). When a radio frame is transmitted through a specific spatial stream, several STAs simultaneously attempt to demodulate and decode the radio frame transmitted through the spatial stream. In MU-MIMO transmission, a VHT-SIG1 field may be called a common VHT-SIG field including common information about all STAs. Accordingly, an AP includes a power save ID in a VHT-SIG2 field that may be called an STA-specific VHT-SIG field and transmits the VHT-SIG2 field so that each of the STAs can determine whether to switch to the sleep mode.

In addition, part of a (partial) AID subfield allocated for an AID or a partial AID or both may be used as a separate indication subfield or indication bit field for indicating multicast or broadcast or both. For example, assuming that bits allocated to be used as the AID or the (partial) AID subfield or both is N, M bits of the N bits may be used as bits for indicating multicast or broadcast or both. If 8 bits are allocated to the (partial) AID subfield and the LSB of the 8 bits indicates 0, the LSB may be set to indicate that a transmitted data frame has been transmitted in unicast. If the LSB indicates 1, the LSB may be set to indicate that the transmitted data frame has been transmitted in multicast or broadcast.

If the LSB of the partial AID subfield indicates 1, STAs trying to receive data in multicast or broadcast or both do not switch to the sleep mode, but may obtain the data by continuing to receive a data frame. On the other hand, if the LSB indicates 0, it can be seen that the relevant data frame has been transmitted in unicast. If a subsequent (partial) AID is its own (partial) AID, a corresponding STA receives the data frame. If the subsequent (partial) AID is not its own (partial) AID, the corresponding STA may switch to the sleep mode.

If the above power reduction method used in the BSS environment is applied to an OBSS environment without change, an STA operated in an area in which BSAs of a plurality of BSSs constituting an OBSS are overlapped with each other may not switch to the sleep mode based on STA ID information in the physical layer level, such as power save IDs or group IDs transmitted by several APs. For example, in the case of a group ID, a situation, such as that shown in FIG. 10, may be generated.

Figure 10:
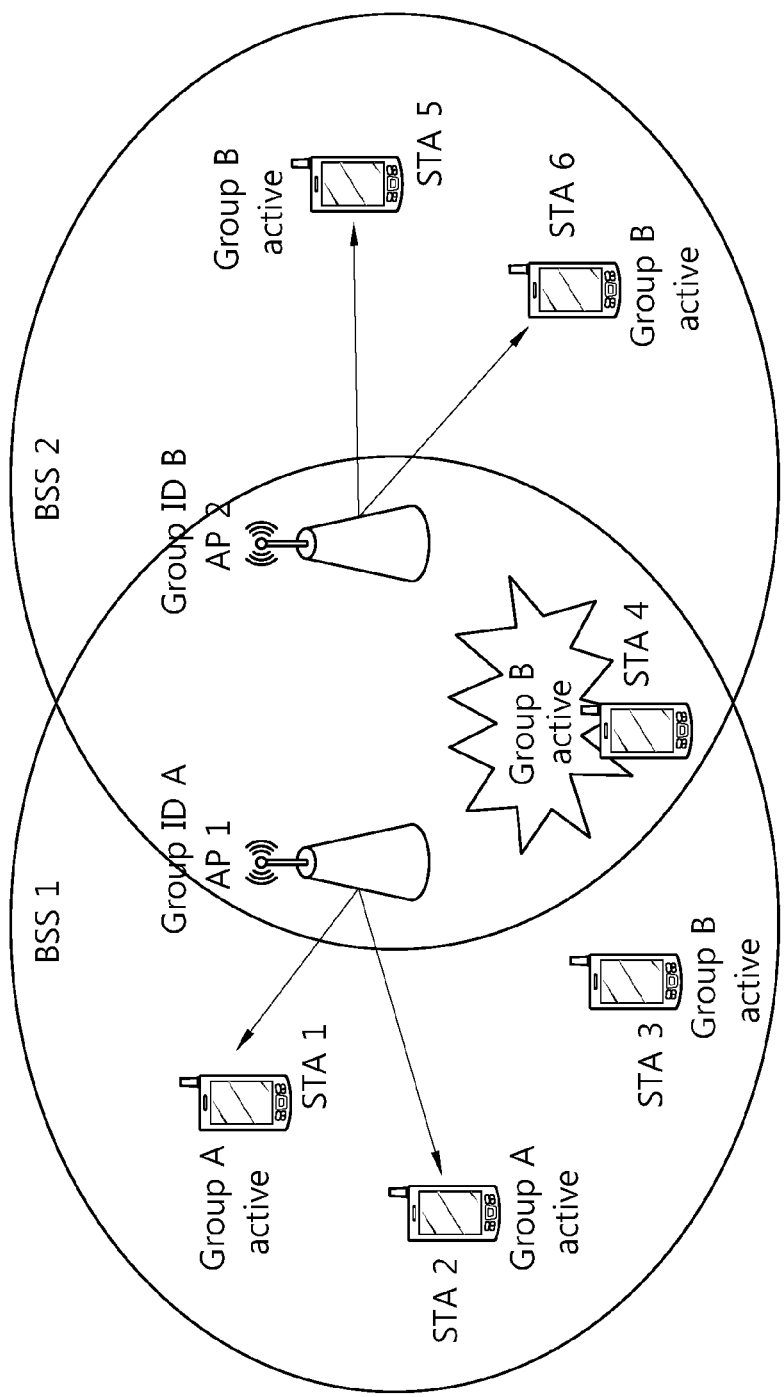
FIG. 10 illustrates a problem that may be generated in an OBSS environment.

FIG. 10 illustrates a problem that may be generated in an OBSS environment.

In the example of FIG. 10, an AP 1 of a BSS 1 has allocated a Group ID A to an STA 1 and an STA 2 and a Group ID B to an STA 3 and an STA 4. Since the AP 1 transmits data to the STA 1 and the STA 2 to which the Group ID A has been allocated, the STA 3 and the STA 4 have to switch to the sleep mode. However, since the STA 4 is operated in the area in which the BSAs of the BSS 1 and a BSS 2 overlap with each other, the STA 4 may not switch to the sleep mode. Since the AP 2 of the BSS 2 transmits data to an STA 5 and an STA 6 to which the Group ID B has been allocated, the STA 4 continues to be operated in the awake mode although the data will not be transmitted to the STA 4.

In order to reduce such unnecessary power consumption, there is proposed a method of including a BSS ID in a VHT-SIG field. To include the BSS ID of 48 bits in the VHT-SIG field without change may be realistically difficult because of a limit to the bit fields of the VHT-SIG field. According to an embodiment of the present invention, in order to solve the problem, CRC masking may be used, or BSS ID information that may replace the BSS ID may be included in the VHT-SIG field. The BSS ID information that may replace the BSS ID is for identifying BSSs constituting an OBSS. The BSS ID information may be composed of about 2 or 3 bits by taking the number of APs which can produce an OBSS environment into consideration. The BSS ID information that may replace the BSS ID is hereinafter referred to as a local AP ID. The local AP ID can identify BSSs by using smaller bits than the BSS ID.

Figure 11:
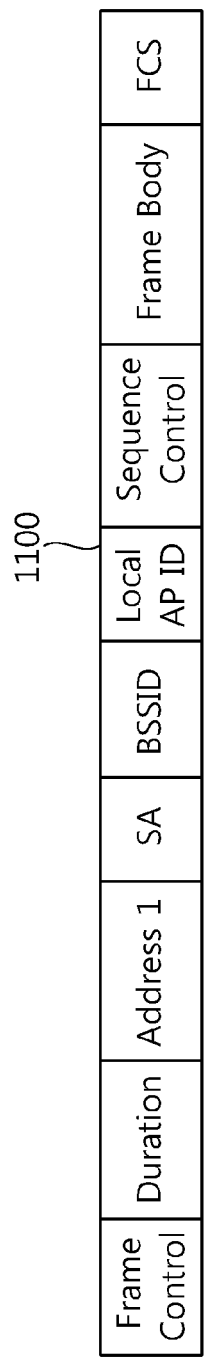
FIG. 11 shows an example of the frame format of a beacon frame including a local AP ID according to an embodiment of the present invention.

The local AP ID, together with the BSS ID, may be transmitted though a beacon frame which is periodically transmitted by an AP. FIG. 11 shows an example of the frame format of a beacon frame, including a local AP ID 1100, according to an embodiment of the present invention.

The local AP ID may be obtained by hashing a BSS ID and used between all STAs and an AP through an agreement. As an example in which the local AP ID is obtained by hashing the BSS ID, only some of the bit fields of the BSS ID may be fetched and used as the local AP ID.

The above problem generated in the OBSS environment may be solved by including a BSS ID or a local AP ID in a VHT-SIG field in addition to a group ID such that an STA having another group ID primarily switches to the sleep mode using the group ID and an STA belonging to another BSS secondarily switches to the sleep mode using the BSS ID or the local AP ID. Here, the group ID may be included in a VHT-SIG1 field and transmitted, and the BSS ID (or local AP ID) may be included in a VHT-SIG 2 field and transmitted.

Figure 12:
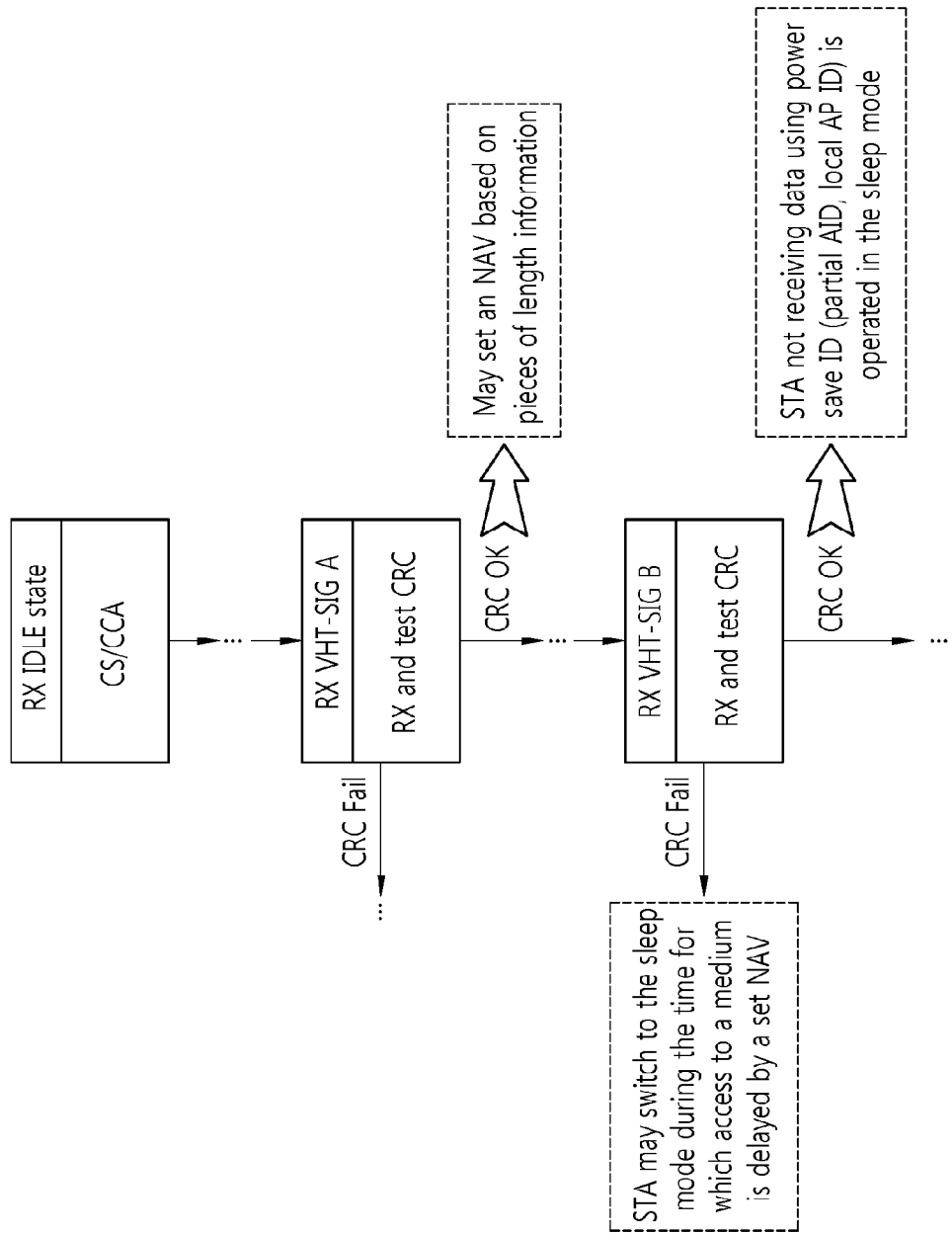
FIG. 12 shows a radio frame reception algorithm for reducing the power consumption of an STA.

FIG. 12 shows a radio frame reception algorithm for reducing power consumption of an STA.

If error is not generated as a result of a CRC after detecting and decoding a VHT-SIG1 field (CRC OK), an STA may obtain information about a VHT length. If information about whether to switch to the sleep mode is included, an STA which does not receive data may switch to the sleep mode (for example, in UL transmission). If error is not generated as a result of a CRC after detecting and decoding a VHT-SIG2 field (CRC OK), STAs which do not receive data may switch to the sleep mode. If error is found as a result of a CRC for the VHT-SIG2 field (CRC fail), the STA may set a Network Allocation Vector (NAV) because it has already obtained the length information from the VHT-SIG1 and may be operated in the sleep mode during the period in which the NAV is set.

In accordance with the embodiments of the present invention described with reference to FIGS. 9 and 10, the AID, the partial AID, the BSS ID, and the local AP ID may be included in the VHT-SIG1 field or the VHT-SIG2 field and then transmitted. According to another method, the AID, the partial AID, the BSS ID, and the local AP ID may be masked to a CRC included in the VHT-SIG1 field or the VHT-SIG2 field and then transmitted.

Information, indicating STAs that should be operated in the awake mode, may be included in the VHT-SIG1 field. Information indicating a data reception STA that must decode and demodulate data, from among the STAs which are indicated in the VHT-SIG1 field and should be operated in the awake mode, may be included in the VHT-SIG2 field.

Figure 13:
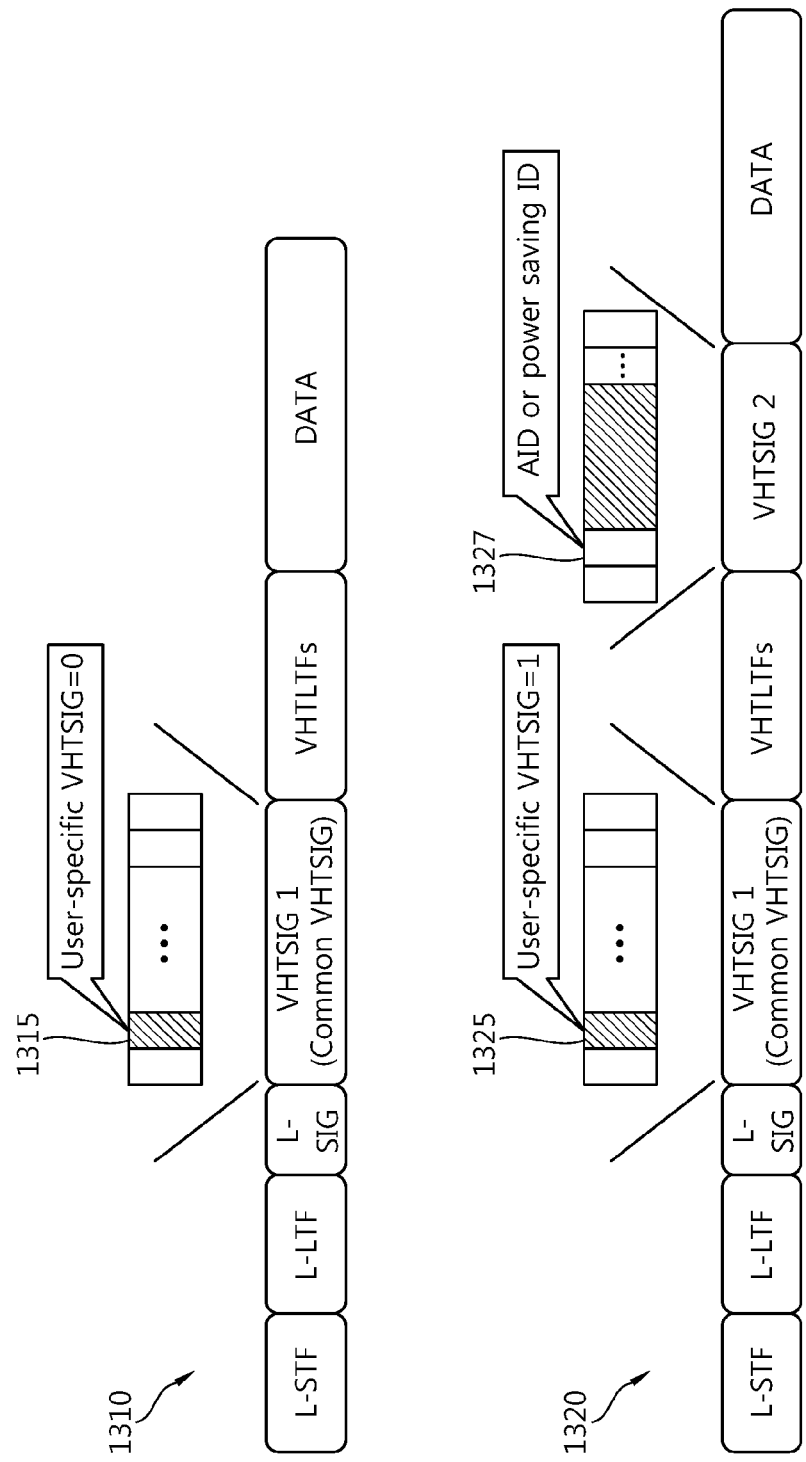
FIG. 13 shows an example of a PLCP frame format that supports SU-MIMO transmission according to an embodiment of the present invention.

FIG. 13 shows an example of a PLCP frame format that supports SU-MIMO transmission according to an embodiment of the present invention.

If all pieces of control information for supporting SU-MIMO transmission can be included in the VHT-SIG1 field of the PLCP frame 900 of FIG. 9, to transmit the VHT-SIG2 field is to transmit unnecessary information, which may serve as overhead. Accordingly, in SU-MIMO transmission, the VHT-SIG2 field may be omitted.

If additional information needs to be transmitted in order to efficiently support SU-MIMO transmission in various environments, however, the VHT-SIG2 field may be transmitted without being omitted, but additional information to be transmitted may be included in the VHT-SIG2 field.

In FIG. 13, a first PLCP frame 1310 shows an example in which all pieces of control information necessary for SU-MIMO transmission are included in a VHT-SIG1 field and transmitted, but a VHT-SIG2 field is omitted. Furthermore, a second PLCP frame 1320 shows an example in which control information necessary for SU-MIMO transmission is included in a VHT-SIG1 field and transmitted, and information that is not transmitted through the VHT-SIG1 field owing to the insufficient bit fields of the VHT-SIG1 field or information that may be additionally supplied is included in the VHT-SIG2 field and transmitted.

If whether to include the VHT-SIG2 field in SU-MIMO transmission is optional as in the example of FIG. 13, information, indicating whether the PLCP frame includes the VHT-SIG2 field, has to be transmitted. In the example of FIG. 13, a user-specific VHT-SIG bit 1315 and a user-specific VHT-SIG bit 1325, included in the VHT-SIG1 field and transmitted, indicate whether the VHT-SIG 2 field is included in the PLCP frame. The user-specific VHT-SIG bit 1325 included in the VHT-SIG1 field of the second PLCP frame 1320 is set to 1 in order to inform that the PLCP frame 1320 includes the VHT-SIG2 field. An AID or a power save ID 1327, included in the VHT-SIG2 field of the second PLCP frame 1320, shows an example of supplementary information which may be included in the VHT-SIG2 field and transmitted.

The frame configuration and the transmission method according to the embodiment of FIG. 13 may be applied to MU-MIMO transmission in a limited situation. When MU-MIMO transmission is supported, control information about each of destination STAs according to the MU-MIMO transmission is included in the VHT-SIG2 field. The control information included in the VHT-SIG2 field may be an MCS of data which is transmitted to each STA. If a channel environment has been stabilized, an MCS used whenever a data frame is transmitted will not be changed. If information included in the VHT-SIG2 field and transmitted is not changed for a given period, the user-specific VHT-SIG bit may be set to 0, and a PLCP frame including only the VHT-SIG1 field may be transmitted. That is, even in MU-MIMO transmission, if information to be transmitted through the VHT-SIG2 field is not changed or maintained identically for a given period, relevant information may be transmitted using the format of the PLCP frame 1310 of FIG. 13, as in SU-MIMO transmission, during the period in which the relevant information is not changed after it is first transmitted.

The embodiment described with reference to FIG. 7 is an example of the method of including information (i.e., the non-overhearing bit), indicating whether STAs other than a transmission STA will continue overhearing, in the VHT-SIG1 field and transmitting the information, in the case of UL transmission. Furthermore, in the embodiment described with reference to FIG. 9, it has been described that the partial AID of N bits may be included in the VHT-SIG1 field as information for identifying a target STA and then transmitted. According to another embodiment of the present invention, when the partial AID of N bits is included in the VHT-SIG1 field and transmitted, the transmission of the information, indicating whether other STAs will continue overhearing described with reference to FIG. 7, may be replaced with the partial AID of N bits. In other words, the transmission of the non-overhearing bit may be replaced with the transmission of the partial AID of N bits.

If the partial AID can be represented by N bits or an M number of states comparable to the N bits, some of the states may be used for the same purpose as the non-overhearing bit. If some of an M number of the states is allocated to indicate that an STA performs transmission to an AP, there is an advantage in that STAs now hearing a relevant PLCP may switch to the power save mode in a bundle because they are not an AP.

Furthermore, in the case where an AP transmits data to STAs in broadcast, all the STAs have to receive the data. Some of an M number of the states may be allocated and used to indicate that an AP or a certain STA performs broadcast transmission in which data is transmitted to a number of unspecific STAs or APs.

In an alternative embodiment, a bit or a field, including information informing broadcasted data or information informing that the target of reception is an AP, may be included in a PLCP header and transmitted.

A reception target indicator indicative of the target of reception may be included in a PLCP header (e.g., a VHT-SIG field) so that an STA or an AP (i.e., not the subject of reception) may switch to the sleep mode. Table 2 shows an example in which reception target indicators are set.

TABLE 2

| reception target indicator | subject of reception |
| --- | --- |
| 0 | STA |
| 1 | AP |
| 2 | Broadcast |

If a reception target indicator indicating the target of reception is included in a VHT-SIG field and additional information aiming to reduce power is included in a PLCP header, the additional information aiming to reduce power may be differently interpreted according to the reception target indicator. For example, if the object indicated by a reception target indicator is an AP, additional information aiming to reduce power may be interpreted as information relating to the AP. If the object indicated by a reception target indicator is an STA, additional information aiming to reduce power may be interpreted as information relating to the STA. For example, if a reception target indicator indicates the target of reception as an STA and an AID or a partial AID is transmitted as additional information aiming to reduce power, an STA that has received the AID or the partial AID interprets the AID or the partial AID, transmitted as the additional information, as the AID or partial AID of an STA not an AP. Table 3 shows another example in which reception target indicators are set.

TABLE 3

| reception target indicator | subject of reception |
| --- | --- |
| 0 | STA |
| 1 | AP |
| 2 | Broadcast for STA |
| 3 | Broadcast for AP |

Meanwhile, an AP is a fixed device, and power efficiency for the AP has been less taken into consideration. If DL data to be transmitted to an STA exists as in FIG. 14, an AP transmits the DL data to the STA when the STA is determined to be operated in the awake mode. For example, when an AP informs that there is data to be transmitted to an STA through a beacon frame, the STA informs the AP that the STA is operated in the awake mode by transmitting a trigger to the AP and then receives the data from the AP. In the case where there is no further data to be transmitted, if the AP transmits an End of Service period (EOSP) to the STA, the STA is operated again in the sleep mode. Even though there is no data to be transmitted to the STA, the AP periodically transmits a beacon frame for the purpose of an operation, such as an operation of associating with a new STA. If there is UL data to be transmitted to an AP, an STA can transmit the UL data to the AP when a channel is determined to be idle according to a CSMA/CA rule because the AP is always operated in the awake mode.

However, as mobile Internet devices, such as smart phones, Netbooks, and MIDs, are recently rapidly popularized, service satisfactory to consumers is not supported using fixed APs, such as the existing wired network or Wi-Fi at home. For this reason, a mobile AP that allows consumers to freely enjoy wireless service anywhere has been in the spotlight. A mobile AP needs to take power consumption efficiency into consideration because it is operated using limited power as in an STA. Accordingly, it is necessary to introduce technology for a power reduction method for an AP.

Figure 14:
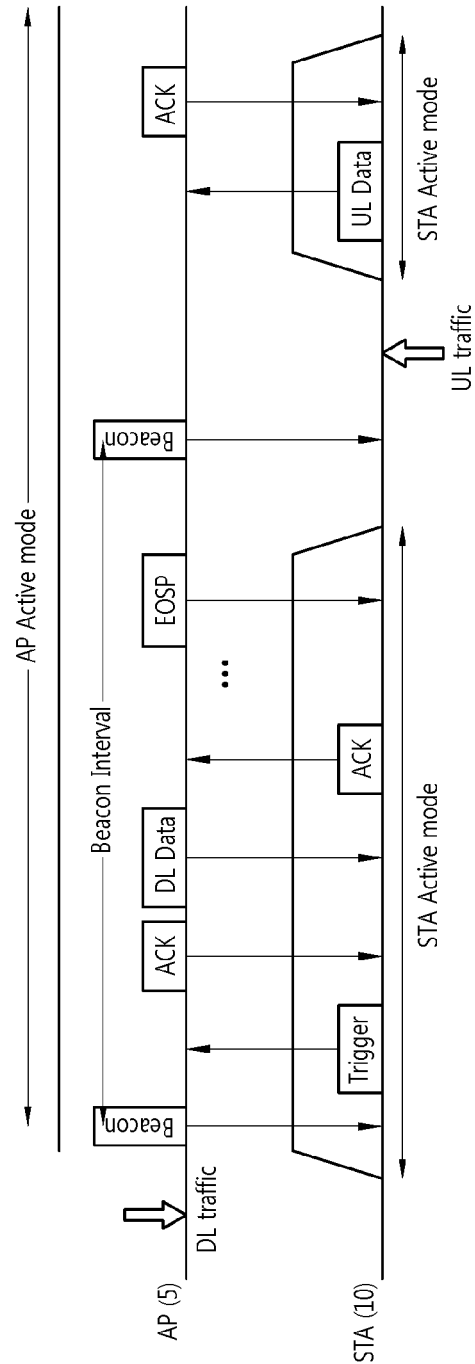
FIG. 14 shows an example of a method of an AP transmitting a frame when an STA is operated in a PS mode.
Figure 15:
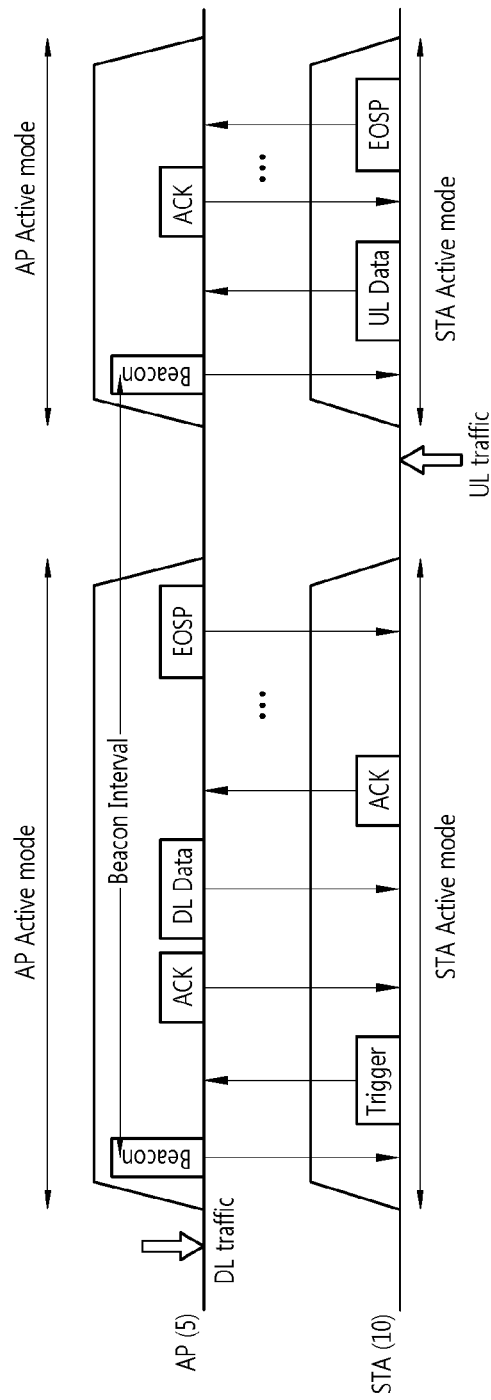
FIG. 15 shows a method of an AP transmitting a frame according to an embodiment of the present invention.

The existing AP is always operated in an active mode. According to an embodiment of the present invention, an AP may place a limitation on the period in which an STA transmits UL data to the AP in order to reduce unnecessary power consumption of the AP, occurring because the AP is always operated in the active mode. In other words, the AP may be operated in the PS mode and may be switched between the awake mode and the sleep mode. If an STA has UL data to be transmitted to an AP, the STA transmits the UL data, buffered when the AP is in the awake mode, to the AP. The AP has to transmit a management frame for informing the STA that the AP is operated in the awake mode. FIG. 15 shows an example of the transmission of the management frame. In the example of FIG. 14, the AP (5) uses a beacon frame to inform that it is operated in the awake mode. The AP (5) may be operated in the awake mode in synchronism with the cycle of a beacon interval because it periodically broadcasts the beacon frame. That is, the STA (10) may know that the AP (5) is operated in the awake mode by receiving the beacon frame and, at this time, may transmit buffered UL data to the AP (5).

If the AP (5) has buffered DL data, the AP (5) informs the STA (10) of the buffered DL data through a beacon frame. The STA (10) being operated in the awake mode transmits a trigger frame and receives the DL data from the AP (5). Meanwhile, if the STA (10) has buffered UL data, the STA (10) may transmit the UL data to the AP (5) after checking that the AP (5) is operated in the awake mode. For example, the STA (10) which has read the beacon frame of the AP (5) may know that the AP (5) is operated in the awake mode. After transmitting the beacon frame, the AP (5) maintains the awake mode for a given period. If there is no UL data transmission, the AP (5) may enter the sleep mode in order to increase the power consumption efficiency of the AP (5). Meanwhile, in the case where the AP (5) has buffered DL data to be transmitted the STA (10) and the STA (10) has buffered UL data to be transmitted to the AP (5), the subject of data transmission is determined through a CSMA/CA rule. In order to receive DL data according to a backoff interval, the STA (10) may transmit a trigger frame to the AP (5) or UL data to the AP (5).

Figure 16:
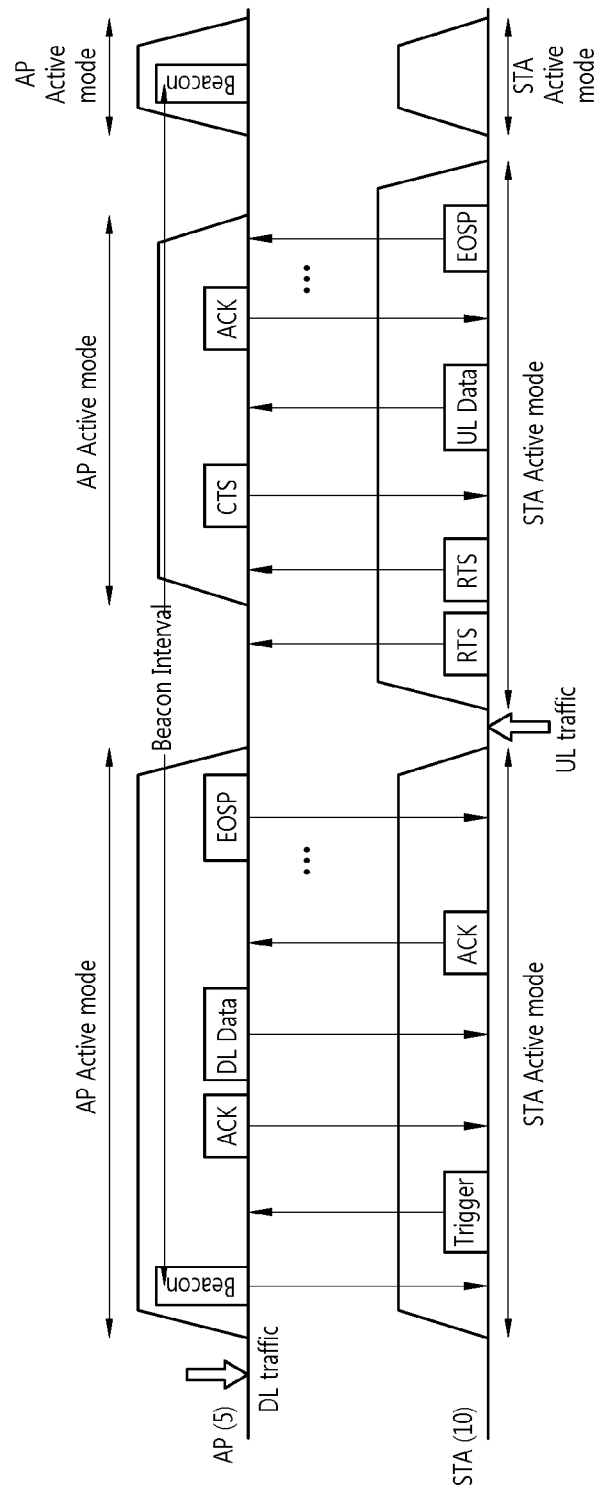
FIG. 16 shows an example in which an AP and an STA are operated in order to reduce the power consumption of the AP according to an embodiment of the present invention.

FIG. 16 shows an example in which an AP and an STA are operated in order to reduce the power consumption of the AP according to an embodiment of the present invention.

In order to increase the power efficiency of an AP, the cycle of a beacon frame transmitted may be increased. In this case, the period in which the AP can transmit DL data to an STA is reduced. Furthermore, transmission delay of UL data may be increased owing to the increased cycle of the beacon frame. In an embodiment of the present invention, in order to improve the above problem, the buffered UL data of an STA may be transmitted between DL beacon frames, as in the example of FIG. 16. An STA (10) transmits an RTS frame to an AP (5) because the STA (10) does not know whether the AP (5) is operated in the awake mode without a beacon frame transmitted by the AP (5). When a CTS frame is received from the AP (5) in response to the RTS frame, the STA (10) transmits UL data to the AP (5). Here, the AP (5) is periodically operated in the awake mode in other times when the beacon frame is transmitted, but does not transmit the beacon frame. Accordingly, the power consumption efficiency of an AP can be increased and the delay of data transmission can be reduced, as compared with the embodiment described with reference to FIG. 14.

Figure 17:
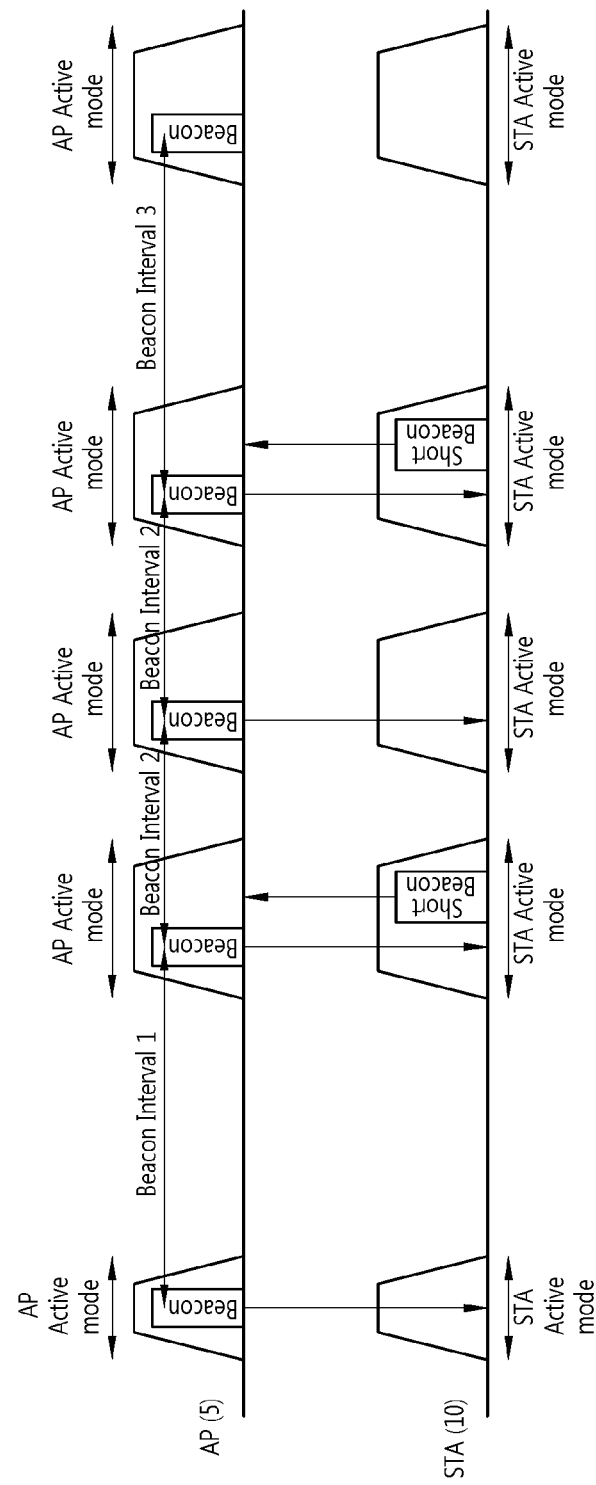
FIG. 17 shows an example in which an AP and an STA are operated in order to reduce the power consumption of the AP according to another embodiment of the present invention.

FIG. 17 shows an example in which an AP and an STA are operated in order to reduce the power consumption of the AP according to another embodiment of the present invention.

In the embodiment of FIG. 16, the STA (10) can transmit UL data to the AP (5) after checking whether the AP (5) is operated in the awake mode through the exchange of the RTS frame and the CTS frame with the AP (5). Here, if the AP (5)

is not operated in the awake mode, the STA (10) may consume unnecessary power by unilaterally transmitting only the RTS frame. However, if the STA (10) provides the AP (5) with information about a point of time at which the STA (10) is operated in the awake mode, the AP (5) can be operated in the awake mode in synchronism with the time when the STA (10) is awaken. In the example of FIG. 17, it is assumed that an AP (5) is operated in the awake mode at a beacon interval 1. An STA (10) transmits a short beacon frame to the AP (5) when the AP (5) is in the awake mode. Here, the short beacon frame includes information about when the STA (10) will become the awake mode. After reading the short beacon frame, the AP (5) can be operated in the awake mode in synchronism with the period in which the STA (10) is awaken. That is, the AP (5) may adjust the beacon interval 1 to a beacon interval 2 according to the status of the STA (10).

If a plurality of STAs is associated with an AP, the AP may be operated in the PS mode based on information transmitted in a short beacon frame from among beacon frames transmitted by the STAs.

The power reduction method of an STA may also be applied to Direct Link Setup (DLS) transmission. DLS transmission means that a direct link is set up between STAs and data is exchanged between the STAs. A DLS procedure for DLS transmission is performed by exchanging a DLS request frame and a DLS response frame.

A source STA trying to perform DLS transmission transmits the DLS request frame to a destination STA via an AP. In response to the DLS request frame, the destination STA transmits the DLS response frame to the source STA via the AP. An example in which an STA 1 (i.e., a source STA) performs DLS transmission to an STA 2 (i.e., a destination STA) is described below. In the following example, the source STA performs DLS transmission to the destination STA, but this is only an example of DLS transmission. For example, a source STA that transmits a frame through DLS transmission may be different from an STA performing DLS transmission, and an STA that receives a frame through DLS transmission may be different from a final destination STA for the frame.

When a direct link is set up between the STA 1 and the STA 2 through the exchange of the DLS request frame and the DLS response frame via the AP, the STA 1 and the STA 2 can transmit and receive data without the help of the AP.

In the case where the STA 1 performs DLS transmission to the STA 2, the efficiency of power can be increased if the STA 2 is operated in the awake mode only when the STA 1 transmits data to the STA 2. In accordance with an embodiment of the present invention, the STA 1 may include a reception target indicator in the header of a PLCP frame transmitted to the STA 2 and transmit the PLCP frame to the STA 2. The reception target indicator included in the header of the PLCP frame may be the AID or partial AID of the STA 2 or may be an indicator of 1 bit, indicating whether the PLCP frame is transmitted to a destination STA (i.e., the STA 2 in this example) of DLS transmission. The reception target indicator may be included in the VHT-SIG field (i.e., a VHT-SIG1 field or a VHT-SIG2 field or both) of the header of the PLCP frame and then transmitted.

Here, the STA 1 can know its own AID allocated by the AP in the association process, but does not know the AID of the STA 2 (i.e., the destination STA). Likewise, the STA 2 can know its own AID, but does not know the AID of the STA 1. According to an embodiment of the present invention, in the case where an AID or partial AID is used as the reception target indicator included in the header of a PLCP frame, the source STA (i.e., the STA 1) and the destination STA (i.e., the STA 2), transmitting data through DLS transmission, need to be informed of a counterpart's AID or partial AID.

According to an embodiment of the present invention, the AID or partial AID may be included in the DLS request frame and the DLS response frame which are exchanged in the DLS procedure and then transmitted.

Table 4 shows an example of pieces of information included in the frame body of a DLS request frame according to an embodiment of the present invention, and Table 5 shows an example of pieces of information included in the frame body of a DLS response frame according to an embodiment of the present invention. A relevant field of each of the pieces of the information may be included in the frame body of the DLS request frame or the DLS response frame and then transmitted.

TABLE 4

| Order | Information |
|---|---|
| 1 | Category |
| 2 | Action |
| 3 | Destination MAC Address |
| 4 | Source MAC Address |
| 5 | Capability Information |
| 6 | DLS Timeout Value |
| 7 | Supported Rates |
| 8 | Extended Supported Rates |
| 9 | Source PHY ID ((partial)AID) |

TABLE 5

| Order | Information |
|---|---|
| 1 | Category |
| 2 | Action |
| 3 | Status Code |
| 4 | Destination MAC Address |
| 5 | Source MAC Address |
| 6 | Capability Information |
| 7 | Supported Rates |
| 8 | Extended Supported Rates |
| 9 | Destination PHY ID ((partial)AID) |

As shown in Table 4, the DLS request frame includes pieces of information, such as a Category, an Action, a Destination MAC Address, a Source MAC Address, Capability Information, a DLS Timeout Value, Supported Rates, Extended Supported Rates, and a Source PHY ID. As shown in Table 5, the DLS response frame includes pieces of information, such as a Category, an Action, a Status Code, a Destination MAC Address, a Source MAC Address, Capability Information, Supported rates, Extended Supported Rates, and a Destination PHY ID.

In Table 4 and Table 5, the Category information represents that a corresponding frame is related to DLS. For example, a Category field included in the frame body of a DLS request frame or a DLS response frame may be set to 2. The Action information may represent that a corresponding frame is related to a DLS request frame or a DLS response frame. If the corresponding frame is related to the DLS request frame, an Action field included in the frame body of the DLS request frame may be set to 0. If the corresponding frame is related to the DLS response frame, an Action field included in the frame body of the DLS response frame may be set to 1. The Destination MAC Address and the Source MAC Address may be set as the respective MAC address values of a destination STA and a source STA. The Capability Information included in the frame body of the DLS request frame includes capability information about an STA that transmits the DLS request frame. The Capability Information included in the frame body of the DLS response frame includes capability information about an STA that transmits the DLS response frame. Likewise, the Supported Rates and the Extended Supported Rates include pieces of information about the rates which are supported by STAs transmitting respective frames. In Table 4, the DLS Timeout value includes a timeout value. If an STA that has transmitted a DLS request frame does not receive a DLS response frame during the duration indicated by a timeout value, a DLS procedure may be terminated. In Table 5, the Status Code represents whether DLS will be permitted in response to a DLS request.

The PHY ID, included in the DLS request frame or the DLS response frame according to the embodiment of the present invention, may be set as the AID or partial AID value of an STA that transmits a DLS request frame (e.g., a source STA or a DLS originator) or of an STA that transmits a DLS response frame. The AID or partial AID is transmitted to the DLS request frame and the DLS response frame exchanged in the DLS procedure. Next, a source STA and a destination STA that subsequently perform DLS transmission can know a counterpart AID or partial AID.

STAs that perform DLS transmission and reception may know a counterpart AID through the exchange of the DLS request frame and the DLS response frame. Next, the partial AID obtained by hashing the counterpart AID may be included in the header of a PLCP frame in a DLS transmission process. Whether its own AID or partial AID is included in the header of a PLCP frame transmitted in the DLS transmission and reception process is checked. Whether a relevant frame will be received or the sleep mode will be entered may be determined based on a result of the check.

According to another embodiment of the present invention, an indicator, indicating whether a PLCP frame is a frame subjected to DLS transmission, may be included in the header of the PLCP frame transmitted through DLS transmission. In other words, in the state in which the STA 1 has set up a direct link with the STA 2, the STA 1 may include an indicator, indicating whether a PLCP frame is transmitted to the STA 2 or transmitted to another STA or an AP, in the header of the transmitted PLCP frame and transmit the PLCP frame.

Figure 18:
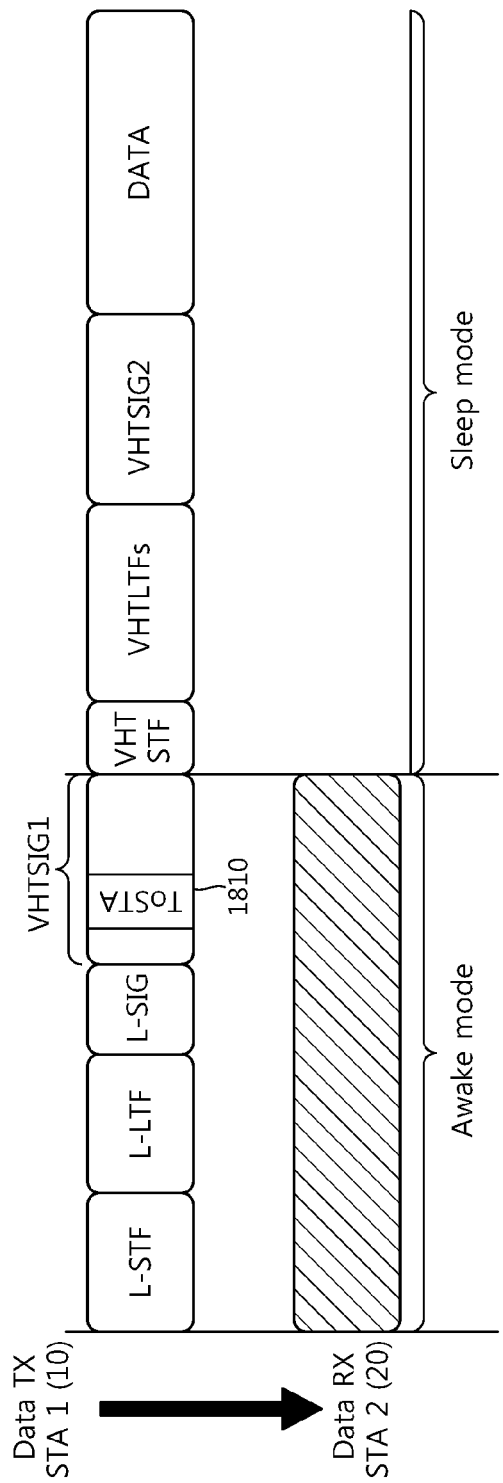
FIG. 18 shows an example in which a transmission target indicator is included in the header of a PLCP frame and transmitted in DLS transmission.

FIG. 18 shows an example in which a transmission target indicator is included in the header of a PLCP frame and transmitted, in DLS transmission.

In the example of FIG. 18, an STA 1 (10) sets up a direct link with an STA 2 (20) and transmits a data frame through DLS transmission. Here, the STA 1 (10) includes a transmission target indicator in the PLCP header of the data frame and transmits the data frame. A To STA subfield 1810 included in a VHT-SIG1 field of FIG. 18 shows an example of the transmission target indicator. The STA 2 (20) may determine whether the data frame is transmitted thereto by checking the subfield To STA 1810 (i.e., the transmission target indicator) and may determine whether to switch to the sleep mode.

FIG. 18 shows the example in which the transmission target indicator is included in the VHT-SIG1 field of the PLCP header and the transmission target indicator indicates that the PLCP frame is not transmitted to the STA 2 (20). The STA 2 (20) knows that the PLCP frame is not transmitted thereto by checking the To STA subfield 1810 and then switches to the sleep mode.

In DLS transmission, the transmission target indicator may become the AID or partial AID of a transmission target STA as described above. In an alternative embodiment, an indicator of 1 bit may be used to indicate whether an STA (i.e., the STA 2 (20) in the example of FIG. 18) that has set up a direct link is a destination STA. In the case where the indicator of 1 bit is used in the example of FIG. 18, if a target STA for a PLCP frame to be transmitted is the STA 2 (20), the STA 1 (10) may set the To STA subfield 1810 of 1 bit to 1. If the target STA for the PLCP frame is not the STA 2 (20), the STA 1 (10) may set the To STA subfield 1810 to 0.

If the To STA subfield 1810 of the data frame received through DLS transmission is 1, the STA 2 (20) may maintain the awake mode and demodulate and decode data. Meanwhile, if the To STA subfield 1810 of the data frame received through DLS transmission is 0, the STA 2 (20) may switch to the sleep mode.

Figure 19:
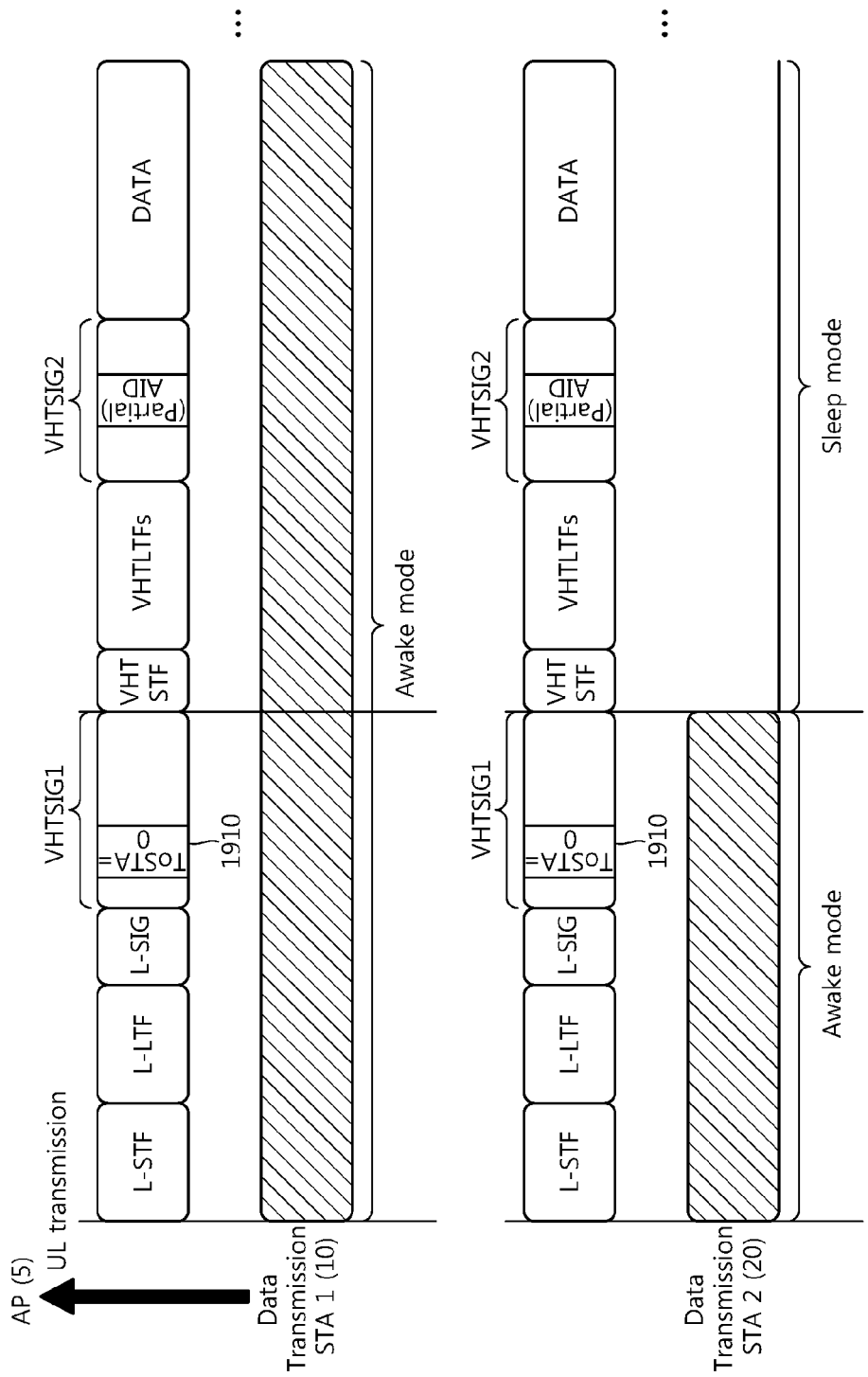
FIG. 19 shows an example in which a PLCP frame, including a transmission target indicator in UL transmission, is transmitted.

The transmission target indicator may also be applied to a UL/DL transmission/reception environment between an AP and an STA. If a value indicated by the To STA subfield is 1, it may mean that a PLCP frame has been subjected to DL transmission. If a value indicated by the To STA subfield is 0, it may mean that a PLCP frame has been subjected to UL transmission. FIG. 19 shows an example in which a PLCP frame, including a transmission target indicator in UL transmission, is transmitted, and FIG. 20 shows an example in which a PLCP frame, including a transmission target indicator in DL transmission, is transmitted.

Referring to FIG. 19, an STA 1 (10) transmits a PLCP frame to an AP (5). A To STA subfield 1910 (i.e., a transmission target indicator) is included in the VHT-SIG1 field of the PLCP frame transmitted by the STA 1 (10). To transmit the PLCP frame from the STA 1 (10) to the AP (5) corresponds to UL transmission, and thus the To STA subfield 1910 may indicate a value of 0 indicative of UL (uplink). An STA 2 (20) does not need to receive the PLCP frame subjected to UL transmission. Accordingly, the STA 2 (20) may enter the sleep mode by checking that the To STA subfield 1910 indicates the value of 0.

Figure 20:
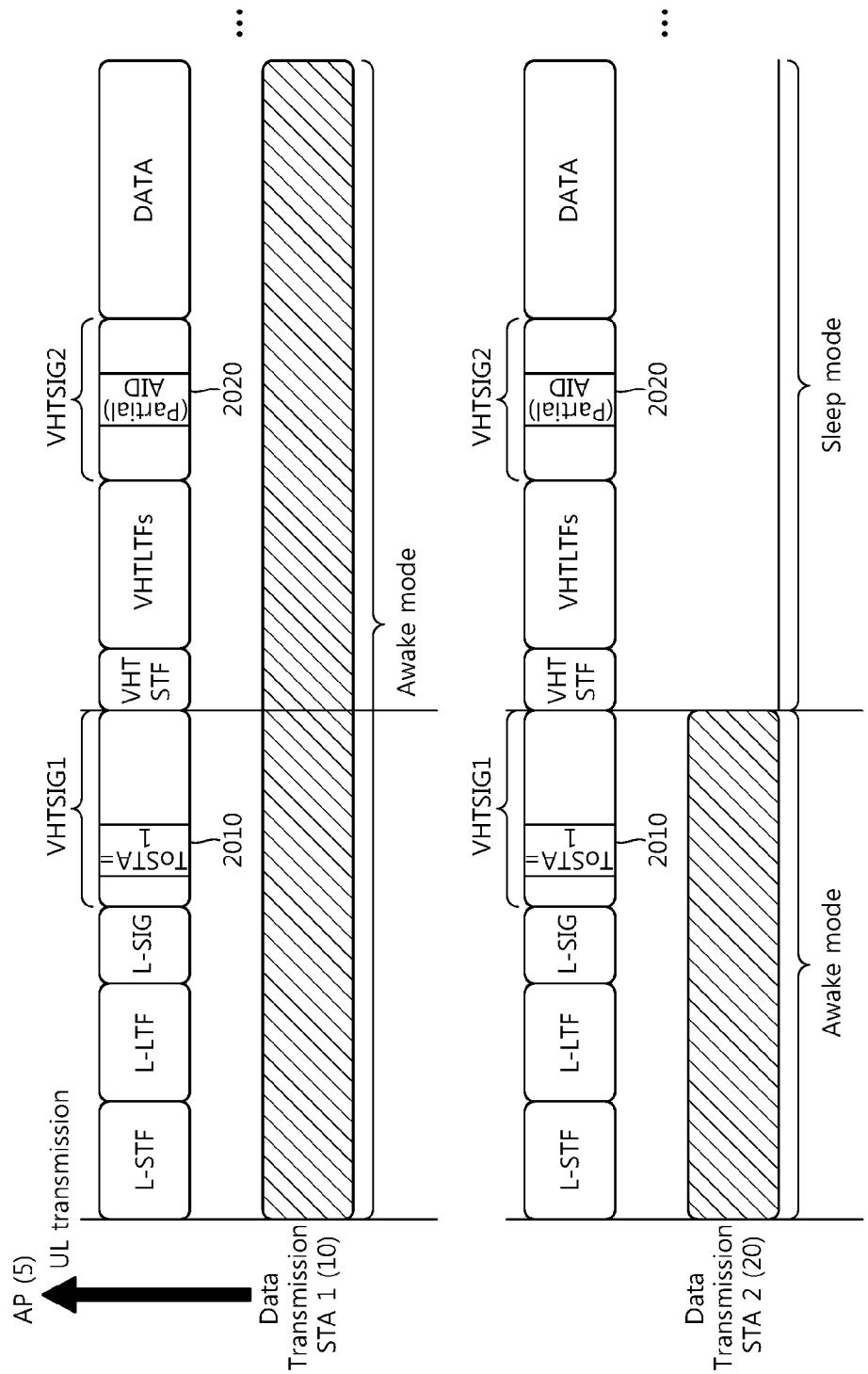
FIG. 20 shows an example in which a PLCP frame, including a transmission target indicator in DL transmission, is transmitted.

Referring to FIG. 20, an AP (5) transmits a PLCP frame to an STA 1 (10). A To STA subfield 2010 (i.e., a transmission target indicator) is included in the VHT-SIG1 field of the PLCP frame transmitted by the AP (5). The VHT-SIG2 field of the PLCP frame may include a (partial) AID subfield 2020 (i.e., a destination STA ID). The (partial) AID subfield 2020 may indicate an AID or partial AID which is allocated to the STA 1 (10) (i.e., a transmission target STA). To transmit the PLCP frame from the AP (5) to the STA 1 (10) corresponds to DL transmission. Accordingly, the To STA subfield 2010 may indicate a value of 1 indicative of DL (downlink).

The STA 2 (20) does not need to receive the PLCP frame transmitted from the AP (5) to the STA 1 (10). Although the STA 2 (20) checks that a value indicated by the To STA subfield 2010 is 1 when receiving the PLCP frame, the STA 2 (20) does not switch to the sleep mode because it cannot determine whether the PLCP frame is for its own or the STA 1 (10). However, if a value indicated by the (partial) AID subfield 2020 is not an AID (or a partial AID) allocated to the STA 2 (20), the STA 2 (20) may switch to the sleep mode.

The embodiments of the present invention in which PS information is included in a PLCP frame in order to reduce power have been described above. A field that may include the PS information as described above may be a VHT-SIG1 field or a VHT-SIG2 field or both. However, the field size of the VHT-SIG1 field may be insufficient to include all pieces of the PS information. Likewise, the field size of the VHT-SIG2 field may be insufficient to include all the pieces of PS information. Accordingly, it is necessary to properly divide and transmit the pieces of PS information. A method of dividing the pieces of PS information into the VHT-SIG1 field and the VHT-SIG2 field and transmitting the PS information is described below. It means that power reduction is sequentially performed over several steps. The method is described in detail with reference to relevant drawings.

Figure 21:
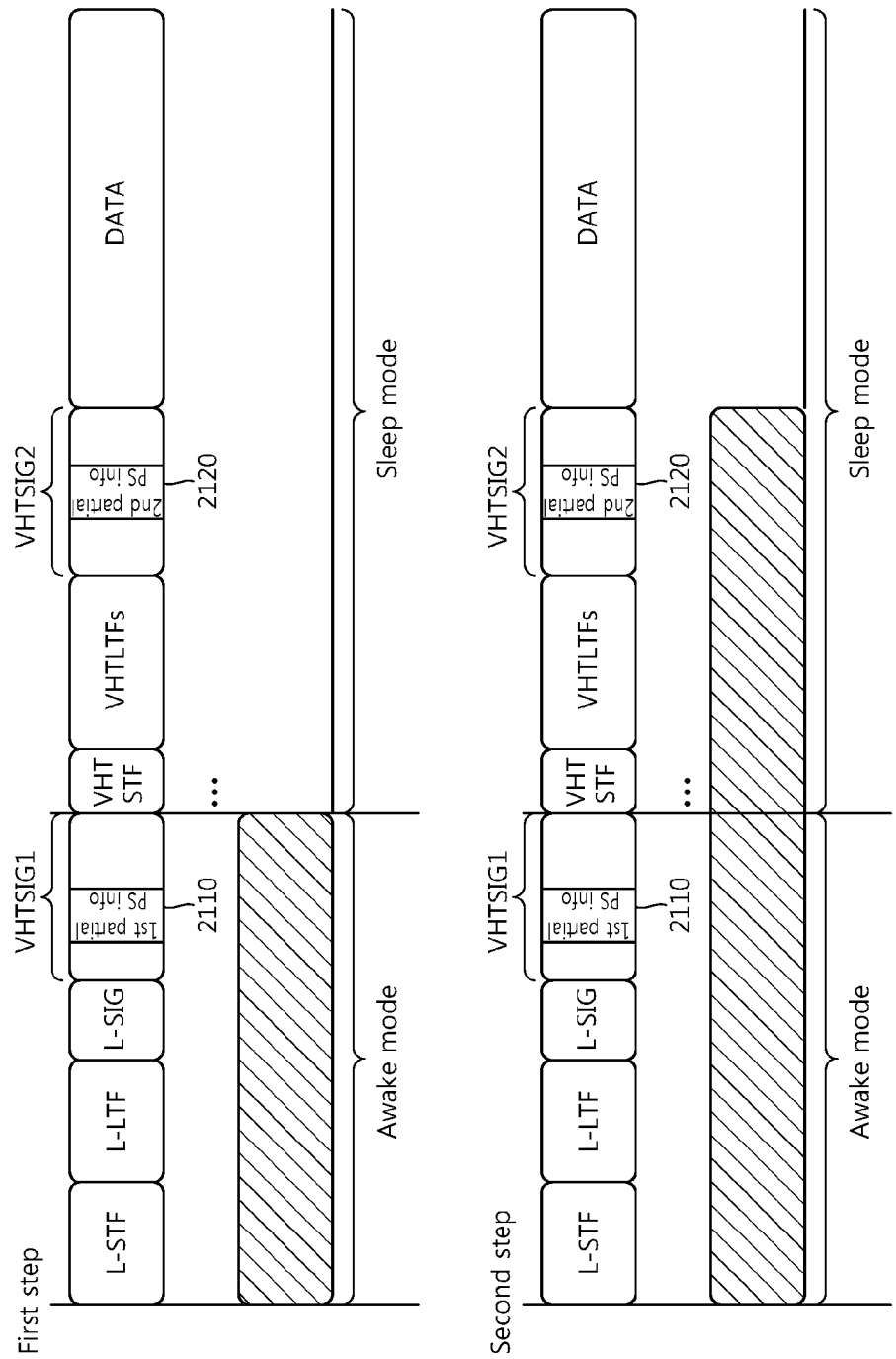
FIG. 21 shows an example in which a PLCP frame for power reduction is transmitted according to an embodiment of the present invention.

FIG. 21 shows an example in which a PLCP frame for a power reduction is transmitted according to an embodiment of the present invention.

Referring to FIG. 21, first partial PS (power save) information 2110 is included in the VHT-SIG1 field of the PLCP frame, and second partial PS information 2120 is included in the VHT-SIG2 field thereof. An STA that receives the PLCP frame may receive up to the VHT-SIG1 field including the first partial PS information 2110 and switch to the sleep mode (a first step) and may receive the VHT-SIG2 field including the second partial PS information 2120 and switch to the sleep mode (a second step). This may be determined by an STA according to which PLCP frame will be received up to which step in order to determine an operation mode.

The above-described AID (or including a partial AID, hereinafter generally referred to as an 'AID') may be used as the PS information. If the AID is used as the PS information included in the VHT-SIG1 field, a relevant PLCP frame may suggest that power reduction is supported in SU-MIMO transmission.

In a WLAN system, assuming that the size of an AID allocated to an STA is M bits, if the size of bits that may be used for the first partial PS information 2110 is N bits in the VHT-SIG1 field, the N bit streams of the entire AID are included in the VHT-SIG1 field, and the remaining M-N bit streams are included in the VHT-SIG2 field. Consequently, in the first step, STAs other than some STAs, complying with the AID as much as the N bits, switch to the sleep mode. Next, in the second step, STAs to which the AID, not complying with the remaining AID of the remaining M-N bits, has been allocated switch to the sleep mode.

As another example of the PS information, a group ID and an AID may be used. This method is more appropriate when a PLCP frame is transmitted through MU-MIMO transmission. The group ID may be included in the VHT-SIG1 field as the first partial PS information 2110 and, and the AID may be included in the VHT-SIG2 field as the second partial PS information 2120.

In the first step, an STA whose group ID indicated by the first partial PS information 2110 is not identical with a group ID allocated thereto may switch to the sleep mode and then operate. In the second step, an STA whose AID indicated by the second partial PS information 2120 is identical with an AID allocated thereto may switch to the sleep mode and then operate.

In addition, the size of the VHT-SIG1 field and the VHT-SIG2 field may not be sufficient for the PS information. In other words, the sum of the VHT-SIG1 field and the VHT-SIG2 field may be smaller than the entire bit sequence size of an AID. In this case, although the VHT-SIG2 field is received in the second step and the second partial PS information is interpreted, an STA (i.e., not the subject to which data will be transmitted) may continue to be operated in the reception standby state. In order to solve this problem, in a third step, PS information may be included in an MAC header included in the data field of a PCLP frame and then provided. The PS information included in the MAC header may include an AID or a group ID or both. In FIG. 21, if an STA (i.e., not the subject to which data will be transmitted) does not switch to the sleep mode even through the first step and the second step, the STA may switch to the sleep mode and operate by checking that it is not a target STA based on the PS information included in the MAC header.

According to yet another embodiment, a method of providing PS information by a combination of a group ID and a partial AID is described below. The partial AID is meant to include the concept of the AID, and the present invention is described below based on the partial AID.

The group ID has been used to indicate SU-MIMO transmission and MU-MIMO transmission for a power save operation. The partial AID has been introduced to support the power save operations of STAs. Furthermore, the partial AID may be used as an ID for indicating the status of broadcast/multicast and a UL transmission type, as described above. Here, the group ID may be used as the ID for indicating a transmission type. A power save operation method of using the group ID to indicate another transmission type, other than the use of the group ID as an indicator for indicating SU-MIMO or MU-MIMO transmission, is described below.

Figure 22:
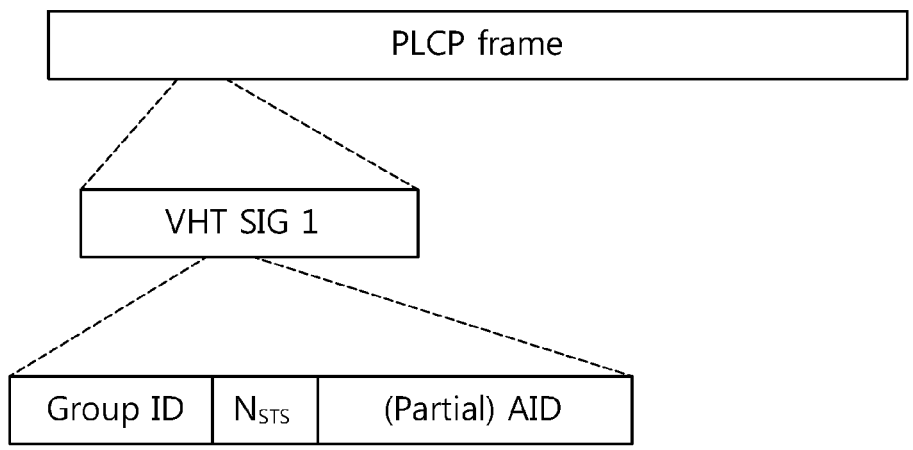
FIG. 22 shows a conceptual diagram of a data frame according to an embodiment of the present invention.

FIG. 22 shows a conceptual diagram of a data frame according to an embodiment of the present invention.

Referring to FIG. 22, the data frame may include a VHT-SIG1 field, and the VHT-SIG1 field may include a group ID subfield, an $N_{STS}$ subfield, and a partial AID subfield. The $N_{STS}$ subfield may indicate the number of spatial streams that may be allocated to an STA. The partial AID subfield may include an ID for identifying an STA and an ID (e.g., information using a hash function of a partial BSS ID or a BSS ID) for identifying an AP.

According to an embodiment of the present invention, the group ID may have a different value according to a transmission type. This may be listed as in Table 6.

TABLE 6

| Order | Information |
|---|---|
| 1 | Uplink (STA → AP) |
| 2 | Broadcasting/Multicasting |
| 3 | SU-MIMO |
| 4 | Group ID #1 for MU-MIMO |
| ... | |
| $2^x$ | Group ID #$2^x$-3 for MU-MIMO |

Referring to Table 6, the group ID may indicate four kinds of transmission types, such as UL transmission (i.e., STA→AP), broadcast/multicast transmission, SU-MIMO transmission, and MU-MIMO transmission. When the group ID indicates MU-MIMO transmission, the group ID may have a plurality of values indicating a group of destination STAs. A case where the group ID indicates SU-MIMO or MU-MIMO transmission has been described above. A case where the group ID indicates UL transmission or broadcast/multicast transmission will be described in detail below.

<1> Broadcast/Multicast Transmission

Figure 23:
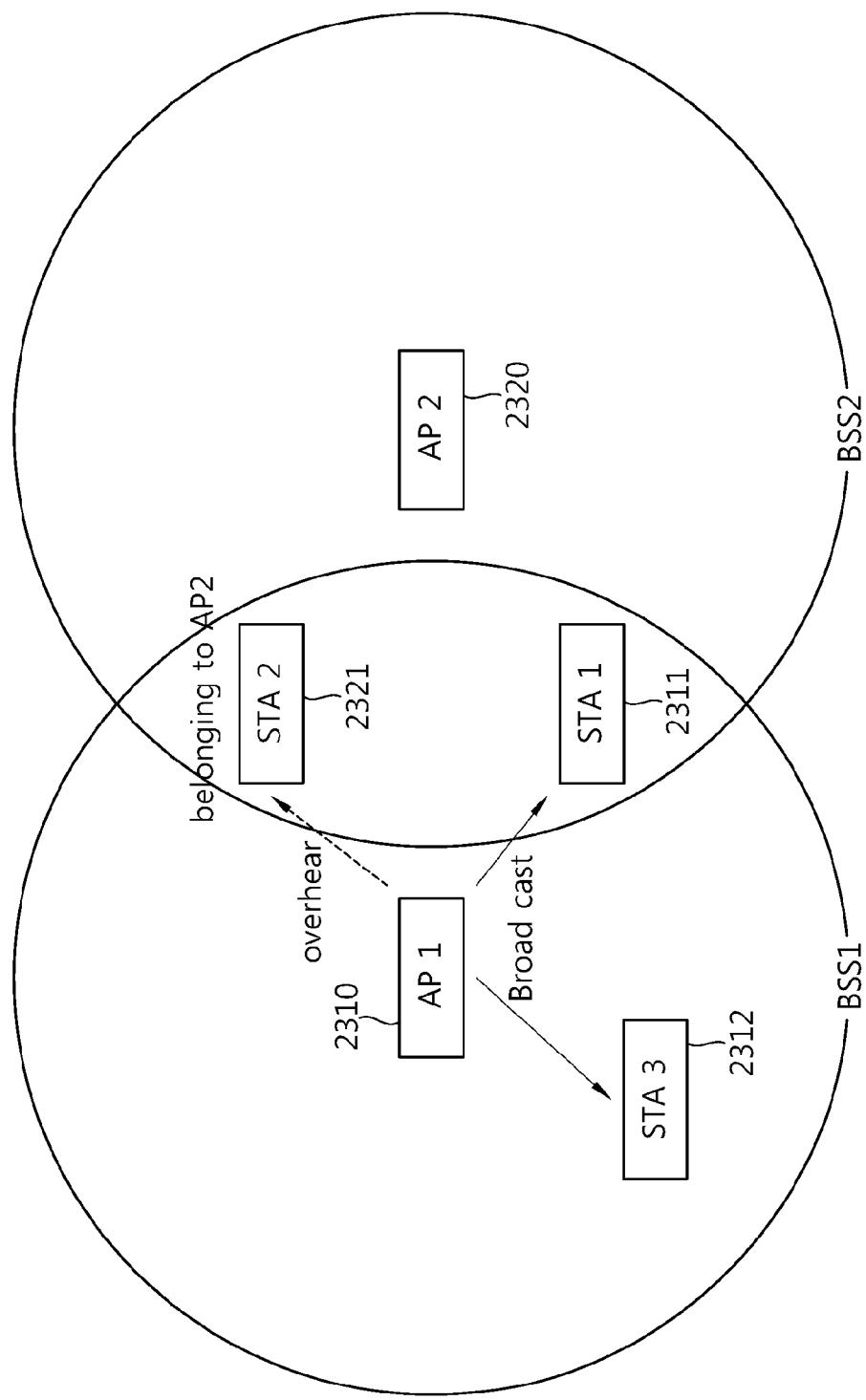
FIG. 23 shows an example in which a frame for a power save operation is transmitted in a broadcast/multicast transmission type.

FIG. 23 shows an example in which a frame for a power save operation is transmitted in the broadcast/multicast transmission type. A WLAN system shown in FIG. 23 is an OBSS in which a BSS 1 based on an AP 1 (2310) and a BSS 2 based on an AP 2 (2320) overlap with each other.

The AP 1 (2310) broadcasts a PLCP frame in order to transmit the PLCP frame to an STA 1 (2311) and an STA 3 (2312). A group ID subfield included in the PLCP frame transmitted by the AP 1 (2310) may indicate that a transmission type is broadcast/multicast transmission. At this time, an STA 2 (2321) may overhear the PLCP frame. Since the group ID indicates that the transmission type is broadcast/multicast transmission, the STA 2 (2321) does not switch to the sleep mode, but continues to receive the PLCP frame. If the group ID subfield indicates broadcast/multicast transmission in order to prevent the STA 2 (2321) (i.e., not a destination STA) from being unnecessarily operated in the awake mode, an AP ID is included in a partial AID subfield and transmitted so that the AP 1 (2310) that has transmitted the PLCP frame can be identified. Information using a hash function of a (partial) BSS ID or a BSS ID may be used as the AP ID. In this case, the STA 2 (2321) receives a VHT-SIG1 field, checks a group ID, and continues to receive the remaining frames because a corresponding frame is broadcasted/multicasted frame. However, the STA 2 (2321) receives a VHT-SIG2 field, checks a partial AID field, determines that a corresponding frame is a PLCP frame related to the AP 1 (2310), and then switches to the sleep mode.

<2> Uplink (STA→AP) Transmission

Figure 24:
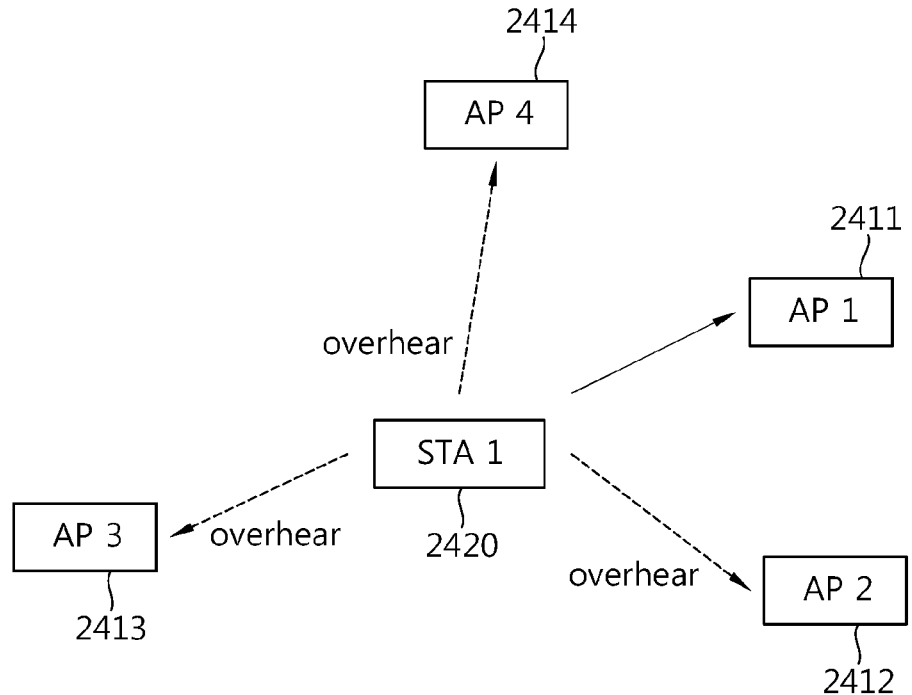
FIG. 24 shows an example in which a frame for a power save operation is transmitted in a UL transmission type.

FIG. 24 shows an example in which a frame for a power save operation is transmitted in the UL transmission type.

An STA 1 (2420) transmits a PLCP frame to an AP 1 (2411) (i.e., an AP associated therewith). The group ID of the PLCP frame transmitted by the STA 1 (2420) may indicate that a transmission type is UL transmission. The PLCP frame transmitted by the STA 1 (2420) may be received by the AP 1 (2411), but may also be overheard by an AP 2 to an AP 4 (2412, 2413, and 2414). Since a separate AID or partial AID is not allocated to an AP unlike an STA, all the AP 2 to the AP 4 (2412, 2413, and 2414) receive a PLCP header although they are not the subjects to which the PLCP frame is transmitted and do not know that they have to switch to the sleep mode before an MPDU is demodulated and decoded. In other words, the APs are unable to determine whether to maintain the awake mode or to switch to the sleep mode or both by receiving a PHY layer, but are able to determine whether to maintain the awake mode or to switch to the sleep mode or both only by receiving an MAC layer.

In accordance with an embodiment of the present invention, when an STA performs UL transmission, the STA may include ID information about an AP to which a PLCP frame will be transmitted in the partial AID subfield of the PLCP frame and then transmit the PLCP frame. A BSS ID, a partial BSS ID, and/or information using a hash function of the BSS ID may be used as the ID information of the AP that may be included in the partial AID subfield.

Referring to FIG. 24, the AP 1 (2411) continues to receive the PLCP frame because the partial AID of the PLCP frame transmitted by the STA 1 (2420) includes the ID information about the AP 1 (2411). Unlike the above, the AP 2 to the AP 4 2411, 2412, and 2413 may check the ID information of the AP included in the partial AID and may switch to the sleep mode and then operate.

Figure 25:
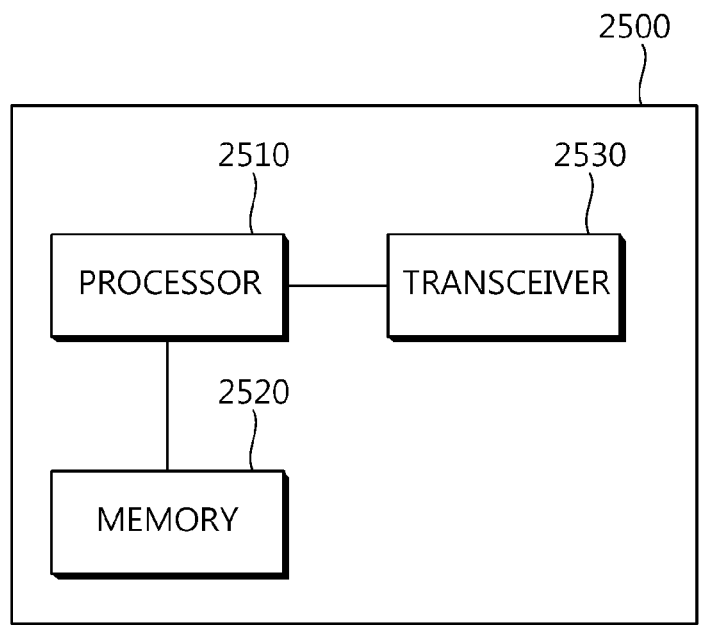
FIG. 25 is a block diagram showing a wireless apparatus in which the embodiment of the present invention is implemented.

FIG. 25 is a block diagram showing a wireless apparatus in which the embodiment of the present invention is implemented.

The wireless apparatus 2500 includes a processor 2510, memory 2520, and a transceiver 2530. The transceiver 2530 transmits and receives a radio signal and has the physical layer of IEEE 802.11 implemented therein. The processor 2510 is functionally connected to the transceiver 2530 and configured to implement the MAC layer and the physical layer of IEEE 802.11. When the processor 2510 performs the operation of an AP in the above-described method, the wireless apparatus 2500 becomes the AP. When the processor 2510 performs the operation of an STA in the above-described method, the wireless apparatus 2500 becomes the STA. The processor 2510 or the transceiver 2530 or both may include Application-Specific Integrated Circuits (ASICs), other chipsets, logic circuits, and/or data processing devices. The memory 2520 may include Read-Only Memory (ROM), Random Access Memory (RAM), flash memory, a memory card, a storage medium, and/or other storage devices. When the embodiment is implemented in software, the above method may be implemented using a module (or a process or function) for performing the above functions. The module may be stored in the memory 2520 and may be executed by the processor 2510. The memory 2520 may be external or internal to the processor 2510 and may be coupled to the processor 2510 through well-known means.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting a frame in a Wireless Local Area Network (WLAN) system, the method comprising:
   receiving, by a first station, information about an association identifier (AID) from an access point, the AID identifying the first station in the WLAN system;
   transmitting, by the first station, a Direct Link Setup (DLS) request frame to a second station to request a setup for a direct link with the second station, the DLS request frame including the AID of the first station;
   receiving, by the first station, a DLS response frame from the second station in response to the DLS request frame, the DLS response frame including an AID of the second station;
   generating, by the first station, a Physical Layer Convergence Procedure (PLCP) Protocol Data Unit (PPDU), the PPDU including a Very High Throughput-Signal (VHT-SIG) field and a PLCP Service Data Unit (PSDU); and
   transmitting, by the first station, the PPDU to the second station via the direct link,
   wherein the VHT-SIG field includes identity information indicating a partial AID that is formed from the AID of the second station and has a length shorter than the length of the AID of the second station.

2. The method of claim 1, wherein the length of the AID of the second station is 16 bits and the length of the partial AID is 9 bits.

3. An apparatus configured to operate in a Wireless Local Area Network (WLAN) system, the apparatus comprising:
   a transceiver; and
   a processor functionally coupled to the transceiver and configured to:
   receive, via the transceiver, information about an association identifier (AID) from an access point, the AID identifying the apparatus in the WLAN system;
   transmit, via the transceiver, a Direct Link Setup (DLS) request frame to a station to request a setup for a direct link with the station, the DLS request frame including the AID of the apparatus;
   receive, via the transceiver, a DLS response frame from the station in response to the DLS request frame, the DLS response frame including an AID of the station;
   generate a Physical Layer Convergence Procedure (PLCP) Protocol Data Unit (PPDU), the PPDU including a Very High Throughput-Signal (VHT-SIG) field and a PLCP Service Data Unit (PSDU); and
   transmit, via the transceiver, the PPDU to the station via the direct link,
   wherein the VHT-SIG field includes identity information indicating a partial AID that is formed from the AID of the station and has a length shorter than the length of the AID of the station.

4. The apparatus of claim 3, wherein the length of the AID of the station is 16 bits and the length of the partial AID is 9 bits.

5. The method of claim 1, wherein the VHT-SIG field further includes a reception target indicator indicating whether the PPDU is destined to the access point or not.

6. The apparatus of claim 3, wherein the VHT-SIG field further includes a reception target indicator indicating whether the PPDU is destined to the access point or not.

7. A method of transmitting a frame in a Wireless Local Area Network (WLAN) system, the method comprising:
  receiving, by a second station, information about an association identifier (AID) from an access point, the AID identifying the second station in the WLAN system;
  receiving, by the second station, a Direct Link Setup (DLS) request frame from a first station to request a setup for a direct link with the second station, the DLS request frame including an AID of the first station;
  transmitting, by the second station, a DLS response frame to the first station in response to the DLS request frame, the DLS response frame including the AID of the second station;
  generating, by the second station, a Physical Layer Convergence Procedure (PLCP) Protocol Data Unit (PPDU), the PPDU including a Very High Throughput-Signal (VHT-SIG) field and a PLCP Service Data Unit (PSDU); and
  transmitting, by the second station, the PPDU to the first station via the direct link,
  wherein the VHT-SIG field includes identity information indicating a partial AID that is formed from the AID of the first station and has a length shorter than the length of the AID of the first station.

8. An apparatus operated in a Wireless Local Area Network (WLAN) system, the apparatus comprising:
  a transceiver; and
  a processor functionally coupled to the transceiver and configured to:
  receive, via the transceiver, information about an association identifier (AID) from an access point, the AID identifying the apparatus in the WLAN system;
  receive, via the transceiver, a Direct Link Setup (DLS) request frame from a station to request a setup for a direct link with the station, the DLS request frame including an AID of the station;
  transmit, via the transceiver, a DLS response frame to the station in response to the DLS request frame, the DLS response frame including the AID of the apparatus;
  generate a Physical Layer Convergence Procedure (PLCP) Protocol Data Unit (PPDU), the PPDU including a Very High Throughput-Signal (VHT-SIG) field and a PLCP Service Data Unit (PSDU); and
  transmit, via the transceiver, the PPDU to the station via the direct link,
  wherein the VHT-SIG field includes identity information indicating a partial AID that is formed from the AID of the station and has a length shorter than the length of the AID of the station.

* * * * *